(12) United States Patent
Paterson-Jones et al.

(10) Patent No.: US 8,190,682 B2
(45) Date of Patent: May 29, 2012

(54) MANAGING EXECUTION OF PROGRAMS BY MULTIPLE COMPUTING SYSTEMS

(75) Inventors: Roland Paterson-Jones, Cape Town (ZA); Christopher C. Pinkham, Cape Town (ZA); Benjamin Tobler, Cape Town (ZA); Willem R. van Biljon, Cape Town (ZA); Gabriel Smit, Cape Town (ZA); Christopher Brown, Cape Town (ZA); Quinton R. Hoole, Cape Town (ZA)

(73) Assignee: Amazon Technologies, Inc., Incline Village, NV (US)

( * ) Notice: Subject to any disclaimer, the term of this patent is extended or adjusted under 35 U.S.C. 154(b) by 1691 days.

(21) Appl. No.: 11/395,463

(22) Filed: Mar. 31, 2006

(65) Prior Publication Data

US 2007/0240160 A1  Oct. 11, 2007

(51) Int. Cl.
*G06F 15/16* (2006.01)
(52) U.S. Cl. ........................................ 709/205; 709/218
(58) Field of Classification Search .................. 709/225, 709/205, 218; 705/1; 711/203; 718/1
See application file for complete search history.

(56) References Cited

U.S. PATENT DOCUMENTS

| | | | | |
|---|---|---|---|---|
| 5,974,454 | A * | 10/1999 | Apfel et al. | 709/221 |
| 6,411,967 | B1 | 6/2002 | Van Renesse | 707/201 |
| 6,430,607 | B1 | 8/2002 | Kavner | |
| 6,457,047 | B1 * | 9/2002 | Chandra et al. | 709/217 |
| 6,529,953 | B1 | 3/2003 | Van Renesse | 709/223 |
| 6,724,770 | B1 | 4/2004 | Van Renesse | 370/432 |
| 6,782,398 | B1 | 8/2004 | Bahl | |
| 6,810,291 | B2 | 10/2004 | Card et al. | |
| 7,076,633 | B2 * | 7/2006 | Tormasov et al. | 711/203 |
| 7,139,821 | B1 | 11/2006 | Shah et al. | |
| 7,430,610 | B2 | 9/2008 | Pace et al. | |
| 7,640,296 | B2 * | 12/2009 | Fuchs et al. | 709/203 |
| 2001/0000811 | A1 | 5/2001 | May et al. | |
| 2001/0056500 | A1 | 12/2001 | Farber et al. | 709/245 |
| 2002/0002613 | A1 * | 1/2002 | Freeman et al. | 709/225 |
| 2002/0082858 | A1 * | 6/2002 | Heddaya et al. | 705/1 |
| 2002/0198953 | A1 * | 12/2002 | O'Rourke et al. | 709/213 |
| 2003/0028642 | A1 | 2/2003 | Agarwal et al. | 709/226 |
| 2003/0145038 | A1 * | 7/2003 | Bin Tariq et al. | 709/202 |
| 2003/0154284 | A1 * | 8/2003 | Bernardin et al. | 709/226 |
| 2004/0044731 | A1 * | 3/2004 | Chen et al. | 709/203 |
| 2004/0059805 | A1 | 3/2004 | Dinker et al. | |

(Continued)

OTHER PUBLICATIONS

Bellovin, S., "Distributed Firewalls," ;login;:37-39, Nov. 1999, http://www.cs.columbia.edu/~smb/papers/distfw.html, 10 pages, retrieved Nov. 11, 2005.

(Continued)

*Primary Examiner* — Brian P Whipple
(74) *Attorney, Agent, or Firm* — Seed IP Law Group PLLC

(57) ABSTRACT

Techniques are described for managing the execution of programs on multiple computing systems, such as computing systems organized into multiple groups. A program execution service manages the program execution on behalf of multiple customers or other users, and selects appropriate computing systems to execute one or more instances of program, such as based in part on locations of one or more previously stored copies of the program from which copies of the program to execute may be acquired. For example, in some situations the selection of an appropriate computing system to execute an instance of a program is based in part on physical or logical proximity to other resources, such as stored copies of the program, executing copies of the program, and/or available computing systems.

81 Claims, 7 Drawing Sheets

U.S. PATENT DOCUMENTS

| | | |
|---|---|---|
| 2005/0168782 A1 | 8/2005 | Kobashi et al. |
| 2005/0283759 A1 | 12/2005 | Peteanu et al. |
| 2005/0283784 A1 | 12/2005 | Suzuki |
| 2006/0047813 A1 | 3/2006 | Aggarwal et al. |
| 2006/0184936 A1 | 8/2006 | Abels et al. |
| 2006/0259581 A1* | 11/2006 | Piersol .......................... 709/217 |

OTHER PUBLICATIONS

Blaze, M., "Using the KeyNote Trust Management System," Mar. 1, 2001, from http://www.crypto.com/trustmgt/kn.html, 4 pages, retrieved May 17, 2006.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Coulson, D., "Network Security Iptables," Mar. 2003, Linuxpro, Part 1, retrieved from http://davidcoulson.net/writing/lxf/39/iptables.pdf, 4 pages.

Coulson, D., "Network Security Iptables," Apr. 2003, Linuxpro, Part 2, retrieved from http://davidcoulson.net/writing/lxf/38/iptables.pdf, 4 pages.

Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.

Kenshi, P., "Help File Library: Iptables Basics," Justlinux, retrieved Dec. 1, 2005, from http://www.justlinux.com/nhf/Security/Iptables_Basics.html, 4 pages.

"The Reverse Firewall™: Defeating DDos Attacks Emerging from Local Area Networks," Cs3, Inc., retrieved Nov. 11, 2005, from http://www.cs3-inc.com/rfw.html, 4 pages.

"Scaleable Trust of Next Generation Management (STRONGMAN)," retrieved May 17, 2006, from http://www.cis.upenn.edu/~dsl/STRONGMAN/, 4 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

"Grid Computing Solutions," Sun Microsystems, Inc., retrieved May 3, 2006, from http://www.sun.com/software/grid, 3 pages.

"Grid Offerings," Java.net, retrieved May 3, 2006, from http://wiki.java.net/bin/view/Sungrid/OtherGridOfferings, 8 pages.

"Recent Advances Boost System Virtualization," eWeek.com, retrieved May 3, 2006, from http://www.eweek.com/article2/0,1895,1772626,00.asp, 5 pages.

"Sun EDA Compute Ranch," Sun Microsystems, Inc., retrieved May 3, 2006, from http://sun.com/processors/ranch/brochure.pdf, 2 pages "Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Softricity Desktop," Softricity, Inc., retrieved May 3, 2006, from http://www.softricity.com/products/, 3 pages.

"Xen—The Xen virtual Machine Monitor," University of CambridgeComputer Laboratory, retrieved Nov. 8, 2005, from http://www.cl.cam.ac.uk/Research/SRG/netos/xen/, 2 pages.

"XenFaq," retrieved Nov. 8, 2005, from http://wiki.xensource.com/xenwiki/XenFaq?action=print, 9 pages.

Clark, C., "Live Migration of Virtual Machines," May 2005, NSDI '05: $2^{nd}$ Symposium on Networked Systems Design and Implementation, Boston, MA, May 2-4, 2005, retrieved from http://www.usenix.org/events/nsdi05/tech/full_papers/clark/clark.pdf, 14 pages.

Demers, A., "Epidemic Algorithms For Replicated Database Maintenance," 1987, Proceedings of the sixth annual ACM Symposium on Principles of Distributed Computing, Vancouver, British Columbia, Canada, Aug. 10-12, 1987, 12 pages.

Gruener, J., "A Vision Of Togetherness," May 24, 2004, NetworkWorld, retrieved May 3, 2006, from, http://www.networkworld.com/supp/2004/ndc3/0524virt.html, 9 pages.

Shankland, S., "Sun to buy start-up to bolster N1," Jul. 30, 2003, CNet News.com, retrieved May 3, 2006, http://news.zdnet.com/2100-3513_22-5057752.html, 8 pages.

Van Renesse, R., "Astrolabe: A Robust And Scalable Technology For Distributed System Monitoring, Management, And Data Mining," May 2003, ACM Transactions On Computer Systems (TOCS), 21(2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtual Iron®, retrieved May 3, 2006, from http://www.virtualiron.com/, 1 page Waldspurger, C.A., "Spawn: A Distributed Computational Economy," Feb. 1992, IEEE Transactions on Software Engineering, 18(2):103-117, 15 pages.

"Global Server Load Balancing with ServerIron," Foundry Networks, retrieved Aug. 30, 2007, from http://www.foundrynet.com/pdf/an-global-server-load-bal.pdf, 7 pages.

Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.

Byun et al., "A Dynamic Grid Services Deployment Mechanism for On-Demand Resource Provisioning," *IEEE International Symposium on Cluster Computing and the Grid*:863-870, 2005.

\* cited by examiner

MANAGING EXECUTION OF PROGRAMS BY MULTIPLE COMPUTING SYSTEMS

CROSS REFERENCE TO RELATED APPLICATIONS

This application is related to U.S. patent application Ser. No. 11/394,595, filed concurrently and entitled "Managing Communications Between Computing Nodes," which is hereby incorporated by reference in its entirety.

TECHNICAL FIELD

The following disclosure relates generally to managing the execution of programs on multiple computing systems, such as by exchanging copies of the programs among groups of computing systems in a manner that enables efficient acquisition of program copies to be executed.

BACKGROUND

Data centers housing significant numbers of interconnected computing systems have become commonplace, such as private data centers that are operated by and on behalf of a single organization, and public data centers that provide access to computing resources to customers under various business models. For example, some public data center operators provide network access, power, and secure installation facilities for hardware owned by various customers, while other public data center operators provide "full service" facilities that also include the actual hardware resources used by their customers. However, as the scale and scope of typical data centers has increased, the task of provisioning, administering, and managing the physical computing resources has become increasingly complicated.

The advent of virtualization technologies for commodity hardware has provided a partial solution to the problem of managing large-scale computing resources for many customers with diverse needs. Generally described, virtualization technologies allow various computing resources to be efficiently and securely shared between multiple customers. For example, virtualization technologies, such as those provided by VMWare, XEN, or User-Mode Linux, may allow single physical computing machine resources to be shared among multiple users. More specifically, each user may be provided with one or more virtual machines hosted by the single physical computing machine, with each such virtual machine being a software simulation acting as a distinct logical computing system. Each virtual machine provides users with the experience that they are the sole operators and administrators of given hardware computing resources, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

However, one problem that arises in the context of data centers that virtually or physically host large numbers of applications or systems for a set of diverse users involves managing the storage, distribution, and acquisition of copies of software applications. Applications may, for example, be quite large in size, making it costly (if not impossible) to have sufficient storage resources to store local copies of every hosted application on every computing system in the data center. However, it is also costly in terms of network bandwidth resources if a centralized storage location is alternatively maintained from which copies of applications are frequently transmitted to every computing system in the data center that is to execute those applications. In such an alternative, network bandwidth would be monopolized for the application copy transmittal and could prevent executing applications from receiving sufficient network bandwidth for their operation. Additionally, significant startup time latencies for application execution could be introduced while waiting for the application copy transmittals to be accomplished, etc. Such difficulties may be further exacerbated by various factors, such as the frequent introduction of new applications to be executed and/or the frequent deployment of successive versions of applications.

Thus, given such problems, it would be beneficial to provide techniques for distributing copies of applications in an efficient manner to computing systems that will execute the applications, as well to provide various other benefits.

DETAILED DESCRIPTION

Figure 1:
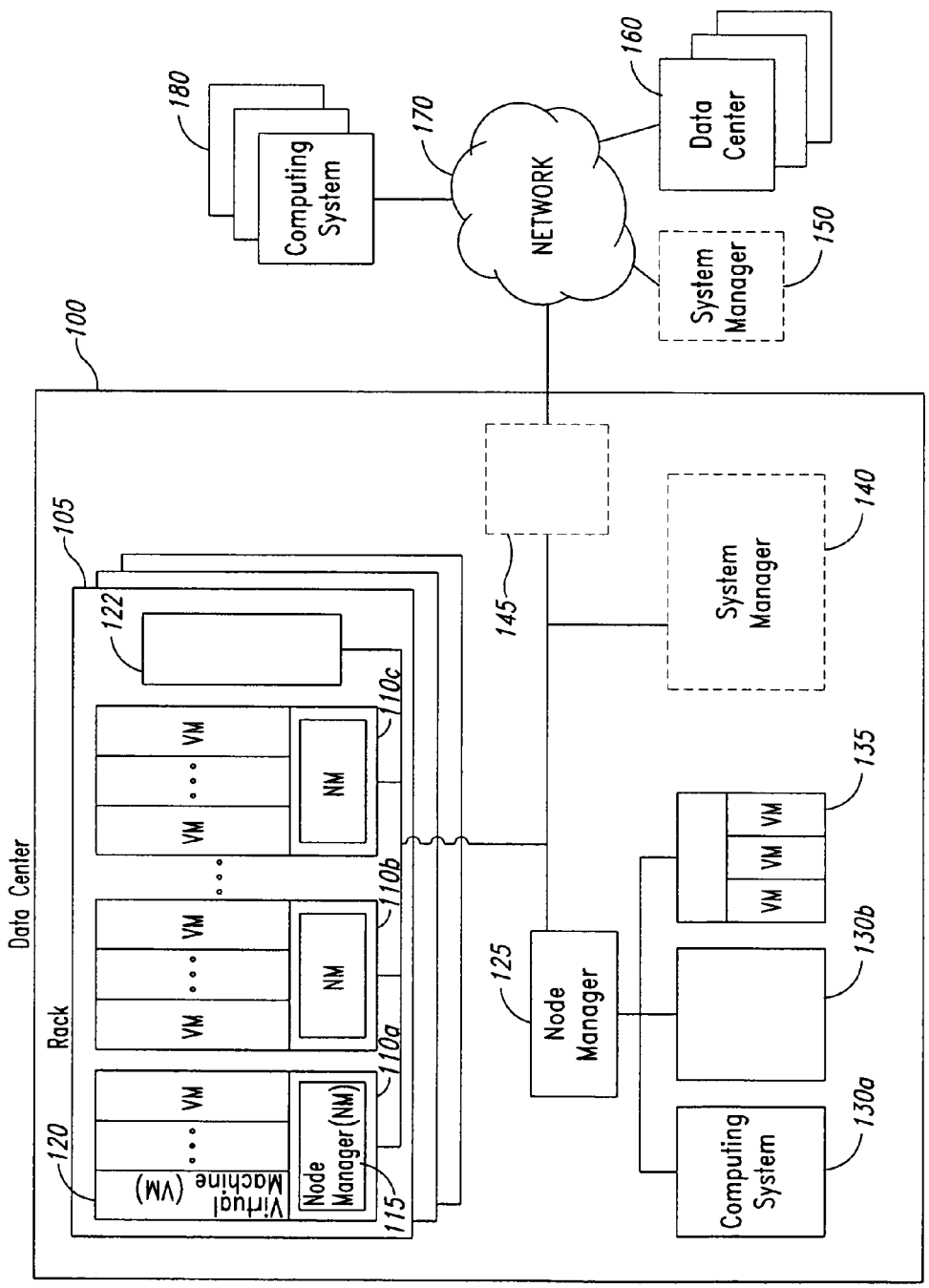
FIG. 1 is a network diagram illustrating an example embodiment in which multiple computing systems exchange and execute programs.

Techniques are described for managing the execution of programs on multiple computing systems. In some embodiments, described techniques are performed on behalf of a program execution service for executing multiple programs on behalf of multiple users of the service (e.g., customers). In some embodiments, the program execution service may use a variety of factors to select an appropriate computing system to execute an instance of a program, such as the location of one or more previously stored copies of the program from which the selected computing system may acquire a copy of the program to execute and/or of available computing system resources for execution of the program instance. For example, in some embodiments the selection of an appropriate computing system to execute an instance of a program may be based, in part, on determining a computing system that already stores a local copy of the program. In another example, the selection of an appropriate computing system may be based, in part, on determining a computing system that is sufficiently proximate (whether geographically and/or logically) to one or more other computing systems that each store such a local copy, such as one or more other computing systems in a common group with the determined computing system.

In some embodiments, the multiple computing systems available to execute programs may include multiple physical computing machines interconnected via one or more networks or other data exchange mediums that are capable of transmitting data between the computing machines. The multiple computing systems may, for example, be located in a physical location (e.g., a data center) and may be separated into multiple groups, and may be managed by one or more system manager modules responsible for those multiple computing systems as a whole and by multiple machine manager modules that are each associated with one of the groups in order to machine the computing systems of the group. At least some of the computing machines may each include sufficient resources to execute multiple programs simultaneously (e.g., sufficient writeable memory and/or one or more of sufficient storage, CPU cycles or other CPU usage measure, network bandwidth, swap space, etc.). For example, at least some of the computing machines in some such embodiments may each host multiple virtual machine nodes that each may execute one or more programs on behalf of a distinct user. As noted, in at least some embodiments, the multiple computing systems managed by the program execution service may be organized into multiple distinct groups (e.g., with each computing system belonging to a single group), such as based on criteria including physical or logical proximity, or having a common data exchange medium. In one example, the common data exchange medium for a group may be provided by a single network switch and/or rack backplane that provides high bandwidth communications between the computing systems of the group (e.g., with some or all of the computing systems that are connected to the network switch or rack backplane being the members of the group). Each group of computing systems may also be connected to other computing systems (e.g., computing systems of other groups, or remote computing systems that are not managed by the program execution service) by one or more other data exchange mediums (e.g., Ethernet-based wiring, a wireless connection, or other data connections), such as other data exchange mediums with lower bandwidth than the groups' common data exchange mediums. Furthermore, in at least some embodiments some or all of the computing systems may each have local program repositories (e.g., hard disks or other local storage mechanisms) that can be used to store local copies of programs for execution, such as prior to or at the time of execution of the program. Additionally, in at least some embodiments, each group of multiple computing systems may use one or more computing systems of the group to store local copies of programs for use by other computing systems of the group.

In an illustrated embodiment, the program execution service may include a software facility that executes on one or more computing systems in order to manage the execution of the programs. The software facility may include one or more machine manager modules for each group of one or more computing systems that manage the retrieval, storage and execution of programs by the computing systems of that group. For example, a distinct machine manager module may be provided for each distinct physical computing machine, such as with a machine manager module for a physical computing machine being executed on at least one of multiple virtual machines of that computing machine. In addition, in some embodiments the software facility may include one or more system manager modules executing on one or more computing systems that manage retrieval, storage and execution of programs for all of the multiple computing systems being used to execute programs. The system manager modules may interact with machine manager modules as appropriate, as discussed in greater detail below.

In at least some embodiments, the execution of one or more instances of a program on one or more computing systems may be initiated in response to a current execution request for immediate execution of those program instances. Alternatively, the initiation may be based on a previously received program execution request that scheduled or otherwise reserved the then-future execution of those program instances for the now-current time. Program execution requests may be received in various ways, such as directly from a user (e.g., via an interactive console or other GUI provided by the program execution service), or from an executing program of a user that automatically initiates the execution of one or more instances of other programs or of itself (e.g., via an API, or application programming interface, provided by the program execution service, such as an API that uses Web services).

Program execution requests may include various information to be used in the initiation of the execution of one or more instances of a program, such as an indication of a program that was previously registered or otherwise supplied for future execution, and a number of instances of the program that are to be executed simultaneously (e.g., expressed as a single desired number of instances, as a minimum and maximum number of desired instances, etc.). In addition, in some embodiments, program execution requests may include various other types of information, such as the following: an indication of a user account or other indication of a previously registered user (e.g., for use in identifying a previously stored program and/or in determining whether the requested program instance execution is authorized); an indication of a payment source for use in providing payment to the program execution service for the program instance execution; an indication of a prior payment or other authorization for the program instance execution (e.g., a previously purchased subscription valid for an amount of time, for a number of program execution instances, for an amount of resource utilization, etc.); and/or an executable or other copy of a program to be executed immediately and/or stored for later execution. In addition, in some embodiments, program execution requests may further include a variety of other types of preferences and/or requirements for execution of one or more program instances. Such preferences and/or requirements may include indications that some or all of the program instances be executed in an indicated geographical and/or logical location, such as in one of multiple data centers that house multiple computing machines available for use, on multiple computing systems that are proximate to each other, and/or on one or more computing system that are proximate to computing systems executing one or more other indicated program instances (e.g., instances of the same program, or of another program). Such preferences and/or requirements may further include indications that some or all of the program instances each be allocated indicated resources during execution.

After receiving a request to execute one or more instances of a program at an indicated time, the program execution service determines one or more computing systems to use in executing the program instances. In some embodiments, the determination of the computing systems to be used is performed at the time of the request even if for future execution. In other embodiments, the determination of the computing systems to be used for future execution of one or more program instances may be deferred to a later time, such as at the future time of execution based on information that is then available. The determination of which computing system to use for execution of each program instance may be made in a variety of ways, including based on any preferences and/or requirements specified in the program request or otherwise specified for the program and/or associated user (e.g., at a time of prior registration). For example, if criteria are determined for preferred and/or required resources for execution of a program instance, the determination of an appropriate computing system to execute a program instance may be based at least in part on whether a computing system has sufficient resources available to satisfy those resource criteria.

In some embodiments, the program execution service may base the determination of which computing system to utilize to execute the program to be executed on the location of one or more previously stored copies of the program to be executed. In particular, as previously noted, in at least some embodiments, the various computing systems that are available to execute programs may be organized into groups (such as with each computing system belonging to one of multiple groups). Accordingly, the determination of whether a computing system is appropriate to execute an instance of a program may be based, in part, on whether one or more computing systems in that computing system's group store local copies of the program. By selecting a computing system to execute an instance of a program that already has a locally stored copy of the program or that belongs to a group that has one or more locally stored copies, various benefits may be obtained, such as to reduce the program execution startup latency based on obtaining a copy of the program. When a computing system in a group stores a local copy of a program to be executed, the program execution service may nonetheless select one or more other computing systems in the group to currently execute instances of the program for various reasons, such as if the computing system with the locally stored copy does not currently have sufficient resources to execute an instance the program, if the computing system with the locally stored copy already is executing one or more instances of the program, etc.

In a further embodiment, the program execution service may select one or more computing systems to execute instances of the program on various other factors. For example, when a user requests that multiple instances of an indicated program be executed at the same time, the program execution service may prefer to distribute the execution of the program instances among computing systems that are members of different groups, such as to provide enhanced reliability in the face of group-specific network outages or other problems. Similarly, in some embodiments multiple instances of a program may be executed on multiple computing systems rather than a single computing system (even if the single computing system has sufficient resources to execute the multiple instances). Such distribution of program instances may, for example, provide enhanced reliability in the face of failure of a single computing system that would instead execute all of the program instances or of loss of connection to that single computing system. In addition, if the computing systems managed by the program execution service are physically (e.g., geographically) separate, the program execution service may be instructed by a user or otherwise prefer to execute multiple instances of a program on computing systems located within a single data center, such as to provide relatively high network bandwidth for communications between instances of the executing program. Alternatively, the program execution service may be instructed or otherwise prefer to execute the multiple program instances in multiple distinct data centers, such as if the program instances have little or no inter-communications, and/or if the various program instances support a number of distinct end-users or applications that are geographically distributed.

After the program execution service determines one or more computing systems to use in executing the instances of a program, the program execution service may initiate execution of those program instances in various ways. For example, the system manager modules may provide instructions and various other execution information to the selected computing systems. Such other information may include, for example, indications of one or more other computing systems that store or that may store local copies of the program. Other types of information provided to a selected computing system may include an indication regarding how long to execute the program instance, an indication regarding resources to allocate to the program instance, an indication of access rights to provide to the program instance, an indication of any restrictions on how to manage execution of the program instance (e.g., what types of communications, if any, to allow the program instance to send or receive), etc.

After a selected computing system is notified to execute one or more instances of an indicated program, the selected computing system attempts to perform the program instance execution in accordance with any received instructions or other associated information (e.g., predefined preferences or requirements). The program execution notification may in at least some embodiments be received by a machine manager module associated with the selected computing system (e.g., a machine manager module executing on the selected computing system, or a machine manager module executing on behalf of a group to which the selected computing system belongs). In such embodiments, the machine manager module may operate to manage the execution of the program instance. For example, in situations in which a selected computing system does not already store a local copy of an indicated program to be executed, the machine manager module may operate to obtain or otherwise acquire a copy of the program for execution, as well as for optional local storage. The acquisition of a program copy may, for example, include contacting one or more computing or other systems (e.g., data storage systems) that are indicated in the notification or that are otherwise known to at least potentially store local copies of the program in order to request or retrieve a copy of the program. The acquisition of a program copy may be performed in a variety of ways in various embodiments, as discussed in greater detail below, including by receiving a copy of the program along with the received notification to execute the program instance(s). As discussed in greater detail below, the program execution service may take a variety of other actions to manage execution of programs in at least some embodiments.

In another aspect, an API may be provided that allows other programs to programmatically initiate requests to execute program instances, as well as to possibly programmatically perform a variety of other types of administrative, provisioning, and management operations. Such operations include, but are not limited to, the creation of user accounts, the reservation of execution resources, the registration of new programs to be executed, the management of groups and access policies, the monitoring and management of executing program instances, etc. The functions provided by the API may be invoked, for example, by client computing systems and devices on behalf of users, including by program instances executing on computing systems of the program execution service.

For illustrative purposes, some embodiments are described below in which the execution of specific types of programs on specific types of computing systems is managed in specific ways. These examples are provided for illustrative purposes and are simplified for the sake of brevity, and the inventive techniques can be used in a wide variety of other situations, some of which are discussed below, and the techniques are not limited to use with virtual machines, data centers or other specific types of computing systems or computing system arrangements.

FIG. 1 is a network diagram illustrating an example embodiment in which multiple computing systems exchange and execute programs, such as under the control of a program execution service. In particular, in this example a program execution service manages the execution of programs on various computing systems located within a data center 100. Data center 100 includes a number of racks 105, and each rack includes a number of computing systems 110a-c, as well as a rack support computing system 122 in this example embodiment. The computing systems 110a-c each host one or more virtual machines 120 in this example, as well as a distinct node manager 115 to manage the virtual machines. In this example, each virtual machine 120 may be employed to provide an independent computing environment for executing an instance of program. In this example, the rack support computing system 122 may provide various utility services for other computing systems local to the rack, as well as possibly to other computing systems located in the data center. The utility services may include, for example, data and/or program storage for other computing systems, execution of one or more machine manager modules to support other computing systems, etc. Each computing system 110 may alternatively have a distinct machine manager module (e.g., provided as part of the node manager for the computing system) and/or have local storage (not shown) to store local copies of programs. The computing systems 110a-c and the rack support computing system 122 all share a common data exchange medium in this example, and may all be part of a single group. This common data exchange medium may be connected to one or more external data exchange mediums shared by, for example, other racks or computing systems in the data center 100.

In addition, the example data center 100 further includes additional computing systems 130a-b and 135 that share a common data exchange medium with a node manager 125, and node manager 125 manages computing systems 130a-b and 135. In the illustrated example, computing system 135 also hosts a number of virtual machines as execution environments for use in executing program instances for one or more users, while computing systems 130a-b do not host distinct virtual machines. In this example, an optional computing system 145 resides at the interconnect between the data center 100 and an external network 170. The optional computing system 145 may provide a number of services such as to act as a network proxy, to manage incoming and/or outgoing data transmissions, etc. Additionally, an optional system manager computing system 140 is also illustrated to assist in managing the execution of programs on other computing systems located within the data center (or optionally on computing systems located in one or more other data centers 160). The optional system manager computing system 140 may execute a system manager module. As previously noted, a system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc.

In this example, the data center 100 is connected to a number of other systems via a network 170 (e.g., the Internet), including additional computing systems 180 that may be operated by the operator of the data center 100 or third parties, additional data centers 160 that also may be operated by the operator of the data center 100 or third parties, and an optional system manager 150. In a manner similar to system manager 140, the system manager 150 may manage the execution of programs on computing systems located in one or more data centers 100 and/or 160, in addition to providing a variety of other services. Although the example system manager 150 is depicted as external to any particular data center, in other embodiments it may be located within a data center, such as one of the data centers 160.

Figure 2:
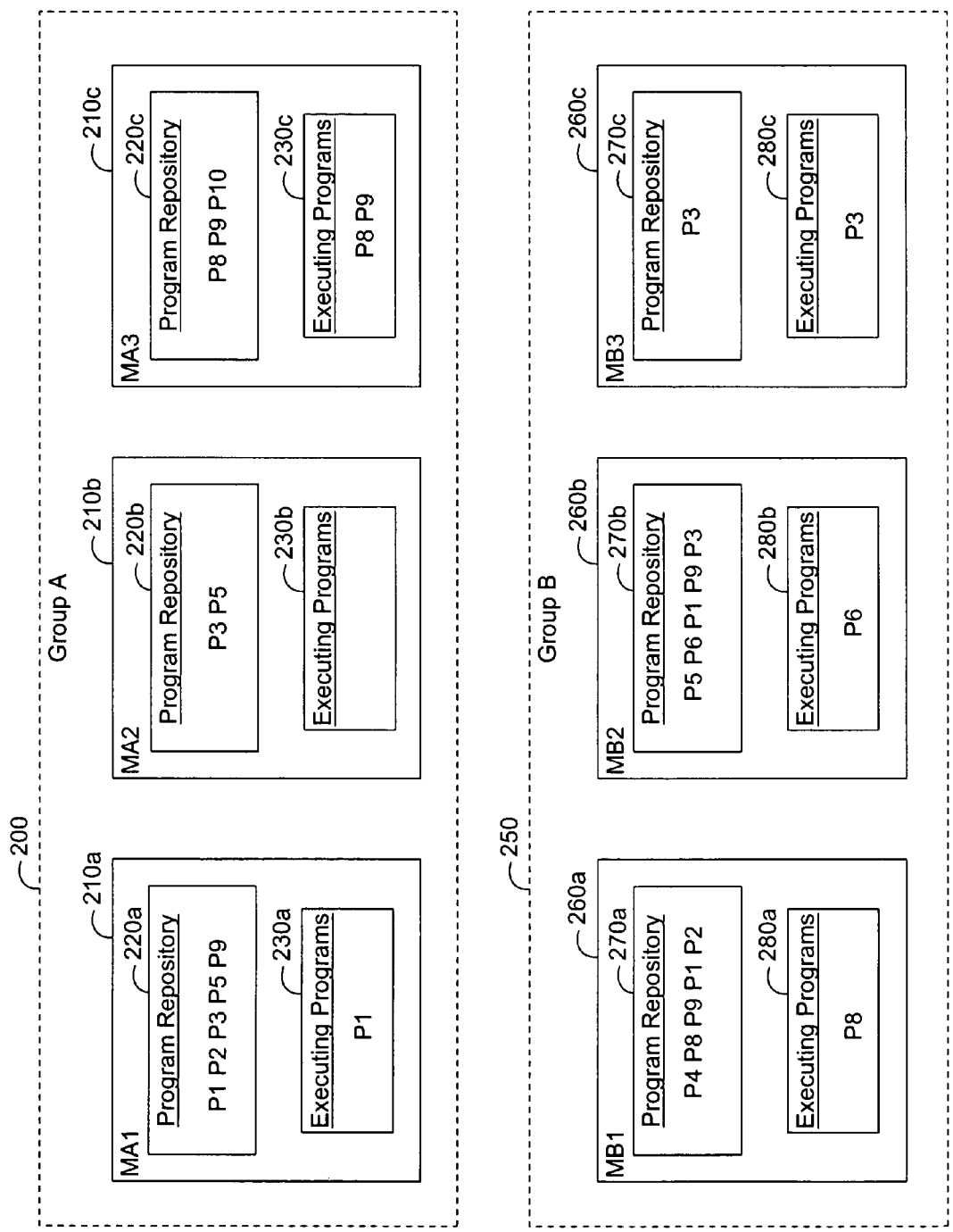
FIG. 2 illustrates an example of groups of computing systems that store and exchange copies of programs.

FIG. 2 illustrates an example of two groups of computing systems that store and exchange copies of programs, such as on behalf of a program execution service. It will be appreciated that in actual embodiments the number of groups, computing systems and programs may be much larger than the groups depicted in FIG. 2. For example, as one illustrative embodiment, there may be 40 computing systems per group and 100 groups per data center, resulting in 4000 computing systems per data center, and each computing system may host 15 virtual machines to execute program instances of customers. Further, if each group includes a dedicated computing system with 2 terabytes of storage, two thousand 1-gigabyte virtual machine image program copies may be stored per group, for a total of 2 million copies per data center. Alternatively, if each of the 40 computing systems per group has 100 gigabytes of local storage, four thousand 1-gigabyte virtual machine image program copies may be stored per group, for a total of 4 million copies per data center. If each hosted virtual machine executes one program, then such a data center may execute as many as sixty thousand program instances at one time. It will be appreciated that in other embodiments other numbers of groups, computing systems and programs may be used, and that programs of much smaller size and/or variable sizes may be stored and executed.

In this example, FIG. 2 depicts two groups, Group A 200 and Group B 250. Group A includes three computing machines 210a-c named MA1, MA2, and MA3, respectively. Group B 250 similarly includes three computing machines 260a-c named MB1, MB2, and MB3. Each group may instead have differing numbers of computing machines of differing types, and in some embodiments a computing machine may be a member of multiple groups or of no group. As described in more detail elsewhere, the computing machines of each group share a common data exchange medium for that group (not shown).

In an illustrative example, each computing machine of FIG. 2 may execute one or more program instances, and may store one or more local program copies in local a program repository (e.g., as part of persistent storage provided by, for example, a hard disk or other storage device). For example, computing machine MA1 has local copies of programs P1, P2, P3, P5, and P9 stored in its program repository 220a, and is currently executing an instance of program P1 as shown in box 230a. In this example, the program repository on each computing machine is limited in storage capacity to a maximum of five program copies, and each computing system is limited in execution resources to a maximum of two program instances executing simultaneously. The limits on the sizes of the program repositories and the number of executing programs employed in this example are for illustrative purposes only, and in other embodiments each computing system may further have distinct resources. Furthermore, while the size of the program repository may in many embodiments be one or more orders of magnitude larger than the size of memory available for use in executing program instances, this need not necessarily be the case. In other embodiments the maximum number of simultaneously executing program instances may be higher, lower, or the same as the number of programs copies that may be locally stored in the program repository. Accordingly, at least some computing machines or other systems may instead provide only one of a local program repository and available resources to execute program instances. Finally, as will be described in greater detail elsewhere, in some embodiments local stored copies of at least some of the programs may be evicted or otherwise removed from storage under certain circumstances, such as to make room for other program copies after a program repository has reached its capacity. In some embodiments executing instances of at least some of the programs may be terminated or otherwise removed from execution under certain circumstances, such as to make room for other executing program instances after program execution resources have reached their capacity.

A number of example scenarios are presented here for illustrative purposes to provide examples of some types of operation of one embodiment of the program execution service. The program execution service may use one or more specified, predefined and/or learned policies to affect the placement of executing program instances on computing machines, with a simplified set of policies used in this example, as follows. First, multiple instances of a program will be executed on computing machines of more than one group if possible. Second, multiple instances of a program will be executed on more than one computing machine if possible. Third, an instance of a program will be executed on a computing machine that has already stored a copy of the program in its program repository if possible. Fourth, an instance of a program will be executed on a computing machine that is a member of a group that has at least one computing machine that has a stored local copy of the program in its program repository if possible. Finally, an instance of a program will be executed on a computing machine with the highest execution resource availability if possible.

Beginning the illustrative examples of managing program execution for these six computing systems, suppose that a client of the program execution service has requested the execution of two instances of program P7. In this case, given the policies described above, the example embodiment of the program execution service will likely opt to execute one instance of P7 in Group A and one instance in Group B, because such placement tends to distribute the copies over more than one group. As between the computing machines of Group A, since none of the computing machines of the group store a local copy of the program, the program execution service will likely opt not to execute a copy of P7 on computing machine MA3 since it is already executing two programs (P8 and P9). As between computing machines MA1 and MA2, MA2 will be chosen for execution because it is currently not executing any programs. In the illustrated embodiment, machine MA2 will acquire a copy of program P7 for execution and optionally for local storage in repository 220b from one or more computing systems external to Group A. For example, machine MA2 may acquire the copy of program P7 from a remote program repository for all of the computing machines of the program execution service and/or from a location external to the program execution service. As for the computing machines of Group B, the program execution service may select any of the three computing machines to execute the P7 program instance, since none of the computing systems store a local copy of the program, and each of the computing machines is executing one program. However, the program execution service may select machine MB3 because it currently only stores one program copy in its program repository. Accordingly, machine MB3 can store a local copy of program P7 if so desired without needing to evict a stored program copy from its program repository.

Next, starting again with the initial conditions shown in FIG. 2, suppose that a client of the program execution service has requested the execution of two instances of program P6. In this case, given the policies described above, the example embodiment of the program execution service will again likely opt to execute one instance of P6 in group A and one instance of P6 in group B, because such placement will distribute instances over more than one group. As between the computing machines of Group A, computing machine MA2 will likely be selected again because none of the computing systems store a local copy of program P6, and computing machine MA2 is the least busy. As amongst the equally busy computing machines of Group B, computing machine MB2 may not be selected because of the policy preferring to distribute copies of a single program over multiple computing machines within a group, despite the fact that only MB2 stores a local copy of the program. Note, however, that other embodiments with different policies that reflect valuing efficiency over reliability may in fact select to execute P6 on computing machine MB2 precisely because a copy of P6 is already stored in the program repository of MB2. As between the remaining candidate computing machines MB3 and MB1, the program execution service may again prefer machine MB3 because there is no need to potentially evict any copies of programs from the MB3 program repository. Accordingly, machine MB3 will, in this embodiment, acquire a copy of program P6 from MB2 for execution and for possible storage in local repository 270c.

Next, starting again with the initial conditions shown in FIG. 2, suppose that a client of the program execution service has requested the execution of one instance of program P4. In this case, given the policies described above, the example embodiment of the program execution service will likely opt to execute P4 on computing machine MB1. In particular, since there are no instances of P4 already executing and only one instance was requested to be executed, the policies preferring to distribute program instances among multiple groups and preferring to avoid placing multiple executing instances of a program on a single computing machine do not apply. Therefore, since MB1 has already stored a local copy of program P4 in its program repository, MB1 will likely be chosen to execute P4.

Next, starting again with the initial conditions shown in FIG. 2, suppose that a client of the program execution service has requested the execution of one instance of program P10. In this case, given the policies described above, the example embodiment of the program execution service will likely opt to execute P10 on MA2. As with the prior example, the policies preferring to distribute instances of programs for execution among multiple groups and avoiding placing multiple instances of a program on a single computing machine do not apply. And while computing machine MA3 is an attractive candidate because it has already stored a copy of P10 in its repository, it does not have the capacity to currently execute P10 because it is already at its limit of two executing programs (P8 and P9). That leaves computing machines MA1 and MA2 as preferable to any computing machines in Group B, because MA1 and MA2 are in the same group as a computing machine (MA3) that has a stored local copy of program P10 in its repository. As between MA1 and MA2, MA2 will likely be selected because it is the least busy, and it will acquire a copy of program P10 from MA3.

Next, starting again with the initial conditions shown in FIG. 2, suppose that a client of the example embodiment of the program execution service has requested the execution of 6 additional instances of program P3. In this case, given the policies described above, the program execution service will likely execute two instances on computing machine MA2 and one instance on each of computing machines MA1, MB1, MB2, and MB3. No instances will likely be executed on computing machine MA3 because that computing machine is already at its limit of two executing programs (P8 and P9). Note that in this case, some embodiments could evict stored local copies of programs from those computing machines with program repositories without excess capacity in order to store a local copy of program P3. For example, in embodiments that choose to always store a copy of the program to be executed in the local program repository prior to execution, computing machines MA1 and MB1 could evict one local program copy from their respective program repositories. Note also that in this case computing machines MA2 and MB3 will likely each end up executing two instances of P3, counter to the policy preferring to distribute multiple instances of executing programs among multiple computing machines. However, because there are no additional computing machines for executing P3 program instances in the given example, the program execution service would choose to execute multiple instances of P3 on a single computing machine if the request is to be satisfied. Alternatively, in some embodiments, the program execution service may apply different weights to the policies such that the program execution service may instead opt to execute less than the requested number of instances, such as to execute a single instance on each of the computing machines MA1, MA2, MB1, and MB3. Similarly, in some embodiments if more than six additional instances are requested of program P3 and the program and/or requester are of sufficiently high priority, the program execution service may instead opt to execute additional instances of P3, such as by terminating execution of another program instance (e.g., instances of programs P8 and/or P9 on MA3) and/or by reserving the next available program instance execution for P3 after one of the currently executing program instances terminates naturally.

In continued reference to the current example, computing machine MB1 has multiple available sources to acquire a copy of program P3 for execution, since both MB2 and MB3 from Group B store local copies of the program, as do computing machines MA1 and MA2 of Group A. In this embodiment, MB1 will request that both MB2 and MB3 of its own group provide a portion of program P3 (e.g., the first X bytes and the second X bytes, where X is a number selected by the program execution service). Machine MB1 will then monitor how rapidly the responses are received from the computing machines, and will request the more responsive computing machine to provide at least the majority (and possibly all) of the remaining portions of the program. In other embodiments the acquisition of a copy of program P3 for computing machine MB1 may be performed in other manners, such as by requesting the program copy from only one of computing machines MB2 and MB3, by requesting at least portions of the program copy from computing machines MA1 and/or MA2 in Group A (whether in addition to or instead of from MB2 and MB3 of Group B), etc.

Figure 3:
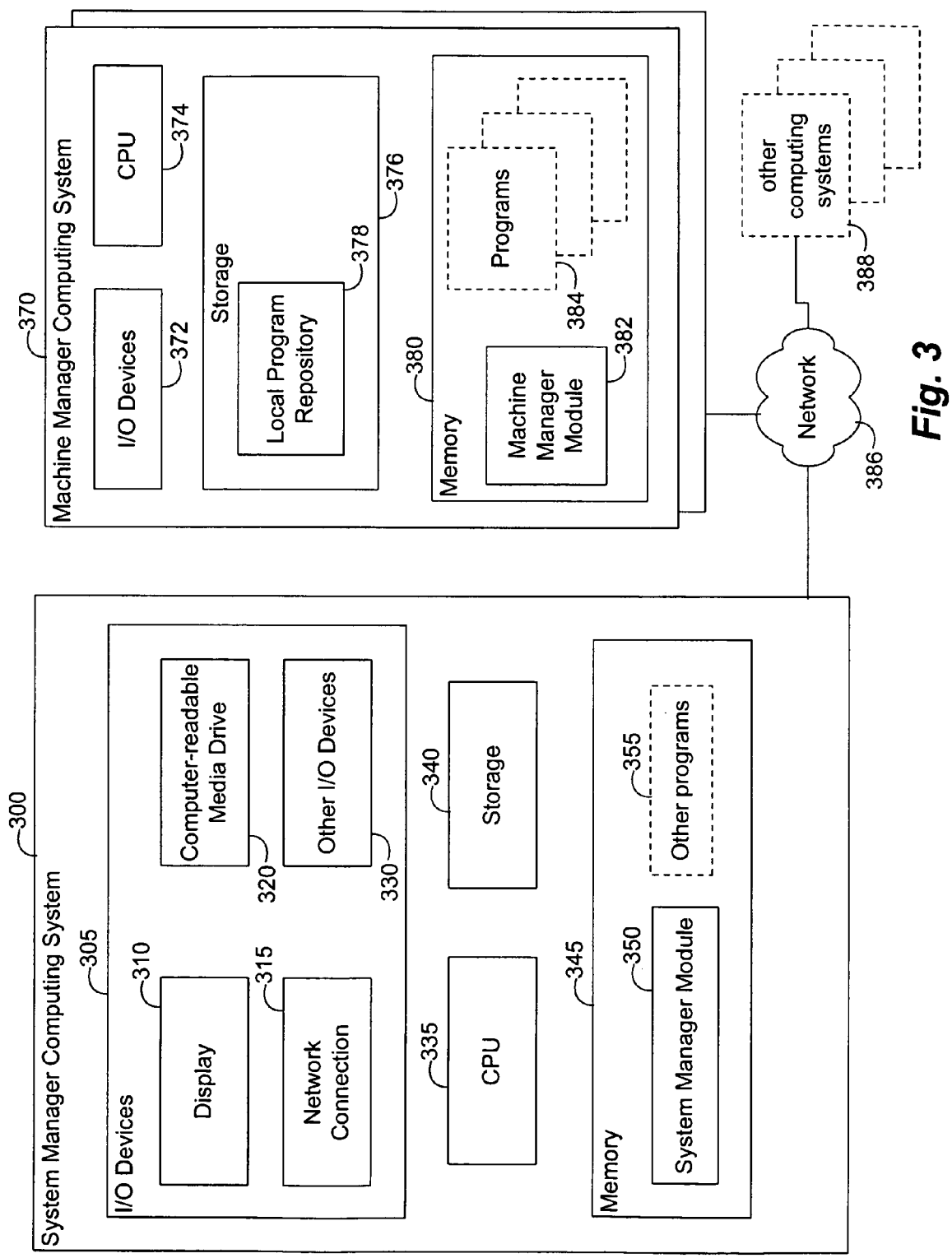
FIG. 3 is a block diagram illustrating example computing systems suitable for managing the execution of programs on multiple computing systems.

FIG. 3 is a block diagram illustrating example computing systems suitable for managing the execution of programs on multiple computing systems being managed, such as by executing an embodiment of a program execution service system. In this example, a computing system 300 executes an embodiment of a system manager module to coordinate execution of programs on the multiple computing systems that are being managed. In some embodiments, the computing system 300 may correspond to the system manager 140 or 150 of FIG. 1. Additionally, one or more machine manager computing systems 370 each execute a machine manager module 382 to facilitate acquisition and execution of programs by one or more associated computing systems. In some embodiments, each of the one or more machine manager modules may correspond to one of the node managers 115 or 125 of FIG. 1. In this example, multiple machine manager computing systems are provided and each act as one of the multiple computing systems of the program execution service that are being managed by the system manager module. In an illustrated example, a distinct machine manager module executes on each of the computing systems 370. In other embodiments, the machine manager module on each of the machine manager computing systems could instead manage one or more other computing systems (e.g., other computing systems 388).

In this example embodiment, computing system 300 includes a central processing unit ("CPU") 335, storage 340, memory 345, and various input/output ("I/O") devices 305, with the illustrated I/O devices including a display 310, a network connection 315, a computer-readable media drive 320, and other I/O devices 330. Other I/O devices that are not illustrated may include keyboards, mice or other pointing devices, microphones, speakers, etc. In the illustrated embodiment, a system manager module 350 is executing in memory 345 in order to manage the execution of programs on other computing systems, and one or more other programs 355 may also optionally be executing in memory 345. Computing system 300 and computing system(s) 370 are connected to each other as well as other computing systems 388 via a network 386.

Each computing system 370 similarly includes a CPU 374, various I/O devices 372, storage 376, and memory 380. In the illustrated embodiment, a machine manager module 382 is executing in memory 380 in order to manage the execution of one or more other programs 384 on the computing system for the program execution service, such as on behalf of customers of the program execution service. In some embodiments, some or all of the computing systems 370 may host multiple virtual machines. If so, each of the executing programs 384 may be an entire virtual machine image (e.g., with an operating system and one or more application programs) executing on a distinct hosted virtual machine. The machine manager module may similarly be executing on another hosted virtual machine, such as a privileged virtual machine that is able to monitor the other hosted virtual machines. In other embodiments, the executing program instances 384 and the machine manager module 382 may execute as distinct processes on a single operating system (not shown) executed on computing system 370. Thus, in this example embodiment, the capabilities of the program execution service are provided by the interactions of system manager 350 and the machine manager modules 382 that communicate via network 386 to jointly manage the distribution, acquisition and execution of programs on the computing systems being managed.

It will be appreciated that computing systems such as computing systems 300 and 370 are merely illustrative and are not intended to limit the scope of the present invention. Computing systems 300 and 370 may be connected to other devices that are not illustrated, including network accessible database systems or other data storage devices. More generally, a computing machine or computing system or data storage system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated system modules may in some embodiments be combined in fewer modules or distributed in additional modules. Similarly, in some embodiments the functionality of some of the illustrated modules may not be provided and/or other additional functionality may be available.

It will also be appreciated that, while various items are illustrated as being stored in memory or on storage while being used, these items or portions of them can be transferred between memory and other storage devices for purposes of memory management and data integrity. Alternatively, in other embodiments some or all of the software components and/or modules may execute in memory on another device and communicate with the illustrated computing systems via inter-computer communication. Some or all of the system modules or data structures may also be stored (e.g., as software instructions or structured data) on a computer-readable medium, such as a hard disk, a memory, a network, or a portable media article to be read by an appropriate drive or via an appropriate connection. The system modules and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
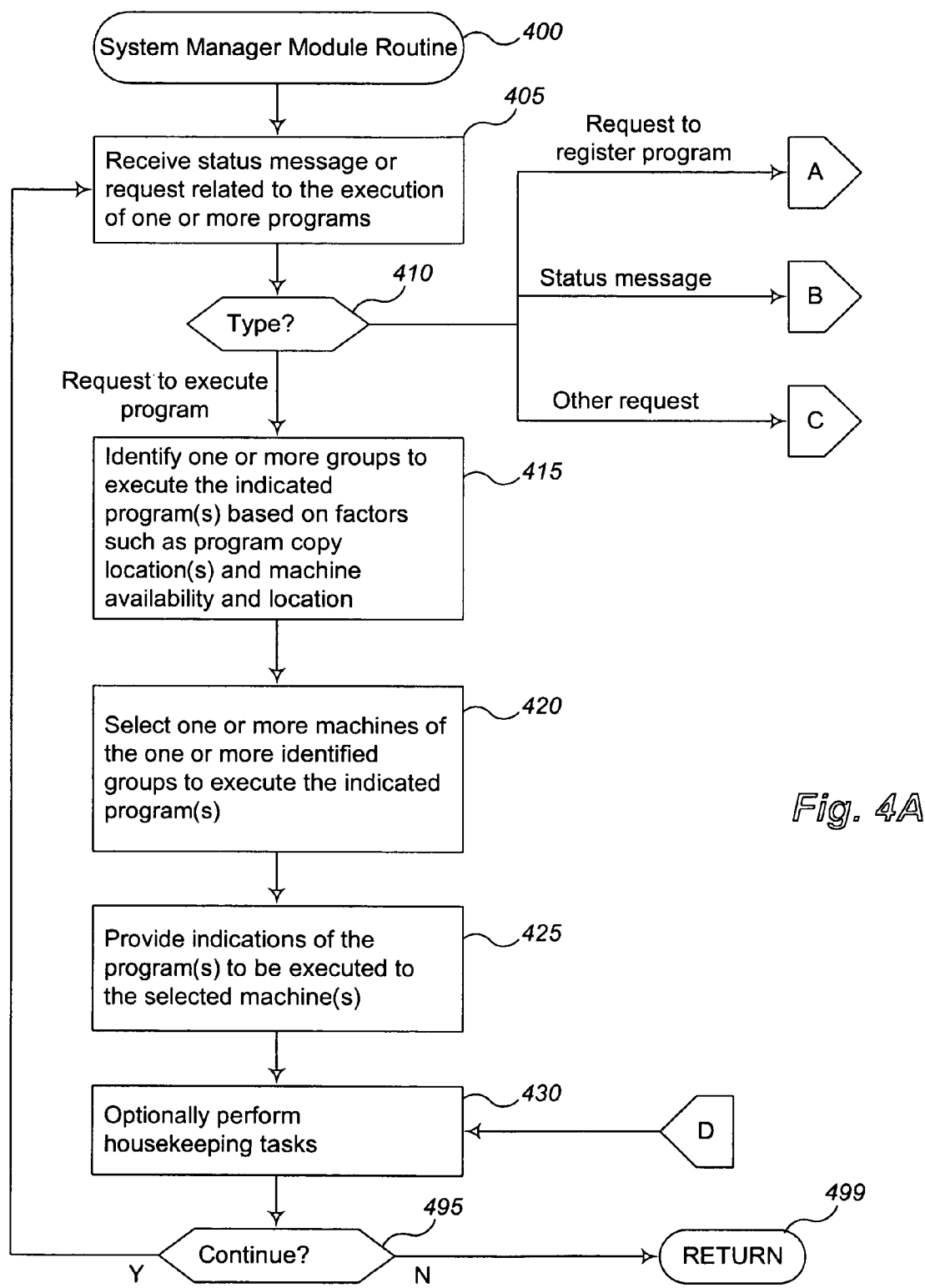
FIGS. 4A-4B illustrate a flow diagram of an embodiment of a system manager module routine.
Figure 4B:
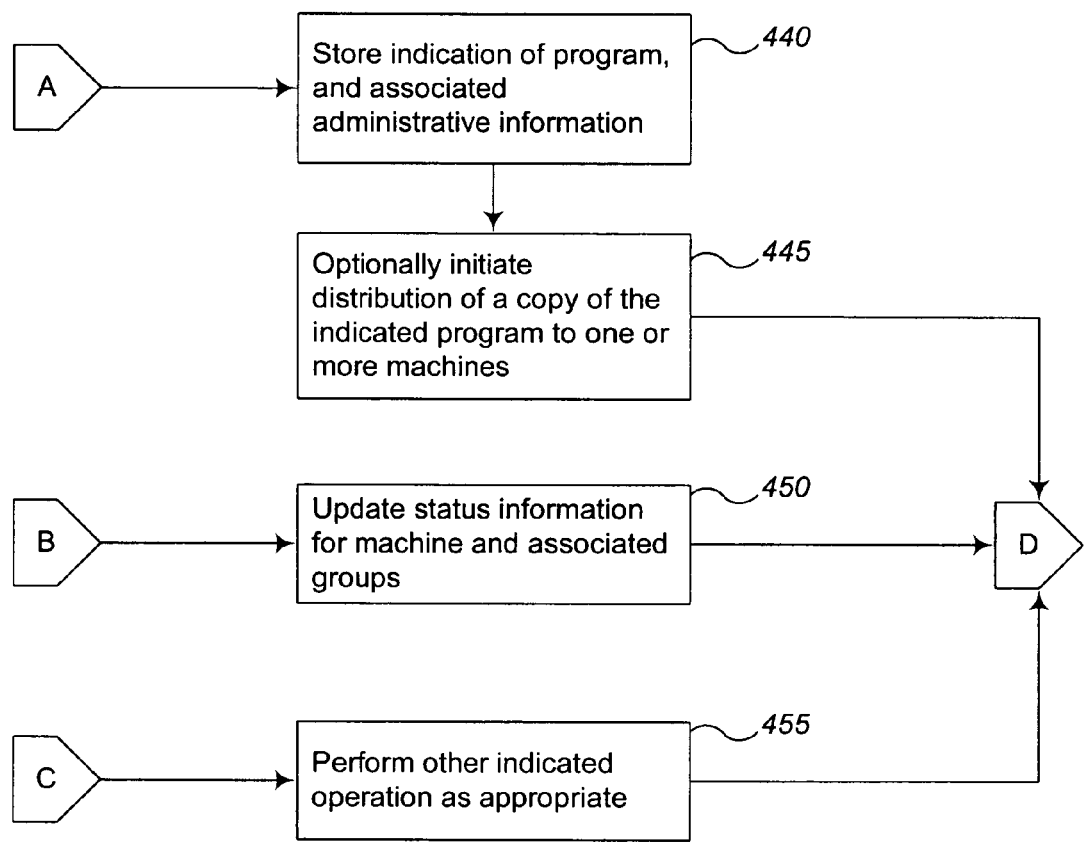

FIGS. 4A-4B illustrate a flow diagram of an embodiment of a system manager module routine 400. This routine may be provided by, for example, execution of the system manager module 140 of FIG. 1 and/or the system manager module 350 of FIG. 3, such as to manage execution of multiple programs on multiple computing systems on behalf of a program execution service.

The routine begins in step 405 and receives a status message or a request related to the execution of one or more programs. The routine then proceeds to step 410 and determines the type of the received message or request. If it is determined that a request to execute one or more instances of one or more indicated programs has been received, the routine proceeds to step 415. In step 415, the routine identifies one or more groups of computing systems to execute the indicated program(s). In step 420, the routine selects one or more computing systems in each of the one or more identified groups to execute instances of the indicated program(s). The selection of the one or more groups may be based on various factors, such as whether a group has one or more computing systems that store one or more local copies of the program(s), the availability of appropriate computing resources, and locations of the computing systems of the groups. The selection of one or more computing systems in an identified group may similarly be based on various factors, such as the location(s) of stored local copies of the program(s) among computing systems of the group and computing resource availability. As previously noted, various specified policies and other criteria may be used as part of the selection of groups and computing systems in various embodiments, including criteria specified by a user or other requester. In addition, in other embodiments groups and particular computing systems may not be individually selected, such as to merely pick the most appropriate one or more computing systems regardless of groups (e.g., if no groups are used).

Next, at step 425, the routine provides an indication of the program(s) to be executed to the selected computing system(s) and/or to one or more machine manager modules associated with those computing systems, such as by sending a message that includes instructions to execute those program instances. In the illustrated embodiment, a distinct machine manager module executes on each of the computing systems, and is the receipt of the message. As previously noted, a variety of types of information may be provided to the machine manager modules, including indications of how to identify one or more computing systems from which to acquire a copy of the program to be executed. Alternatively, in some embodiments the system manager may directly provide a copy of an indicated program to a computing system and/or initiate the execution of a program on a computing system without the intervention of a machine manager module or other additional module.

If it was instead determined in step 410 that a request to register a new program was received, such as from a user, the routine proceeds to step 440 and stores an indication of the program and any associated administrative information, such as the identity of the user who registered the program. Next, in step 445, the routine optionally initiates distribution of a copy of the indicated program to one or more computing systems. For example, in some embodiments the system manager may elect to seed one or more computing systems and/or program repositories in one or more data centers with stored local copies of the indicated program in order to improve the efficiency of later program execution initiation.

If it was instead determined in step 410 that a status message was received to reflect the operations of one or more of the managed computing systems, the routine proceeds to step 450 and updates status information for the one or more computing systems. For example, the machine manager module may determine that an associated computing system has modified the program instances being executed and/or the local program copies being stored, and may accordingly provide a status message to the system manage. In some embodiments, status messages will be sent periodically by machine manager modules in order to keep the system managers informed as to the operational status of the managed computing systems for use in the selection of appropriate computing systems to execute programs. In other embodiments, status messages may be sent at other times (e.g., whenever a relevant change occurs). In other embodiments, the system manager module may instead request information from machine manager modules as desired. Status messages may include a variety of types of information, such as the number and identity of programs currently executing on a particular computing system, the number and identity of copies of programs currently stored in the local program repository on a particular computing system, performance-related and resource-related information (e.g., utilization of CPU, network, disk, memory, etc.) for a computing system, configuration information for a computing system, and reports of error or failure conditions related to hardware or software on a particular computing system.

If it was instead determined in step 410 that any other type of request was received, the routine proceeds to step 455 and performs other indicated operations as appropriate. Such operations may include, for example, responding to status queries from other components in the system, suspending or terminating the execution of one or more currently executing programs, migrating currently executing programs from one computing system to another, shutting down or restarting the system manager, etc.

After steps 425, 445, 450, and 455, the routine proceeds to step 430 and optionally performs any housekeeping tasks, such as calculating billing information for users, updating display information, sending periodic queries to node managers or other components, rotating logs or other information, etc. Next, the routine proceeds to step 495 and determines whether to continue. If so, the routine returns to step 405, and if not proceeds to step 499 and returns.

Figure 5:
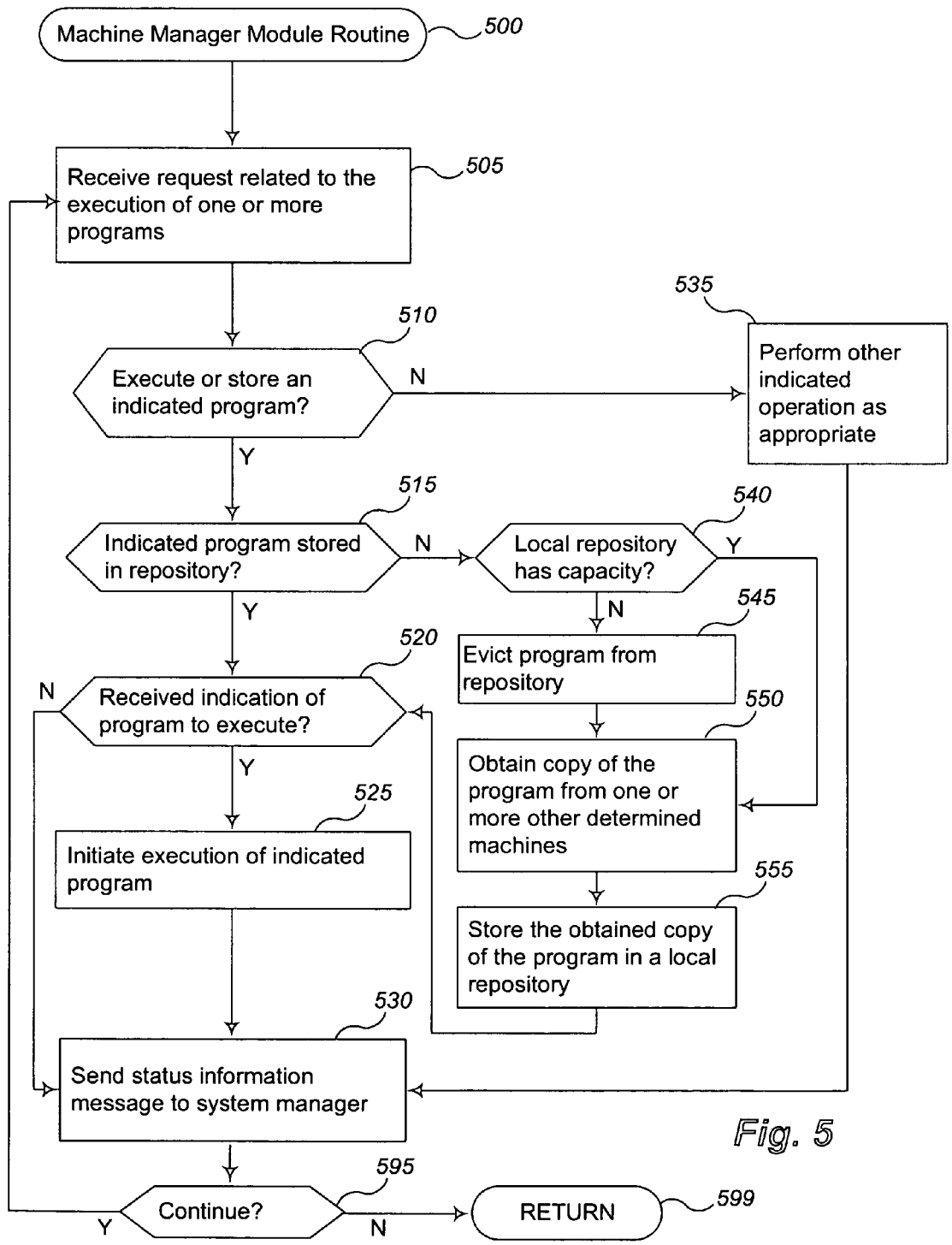
FIG. 5 illustrates a flow diagram of an embodiment of a machine manager module routine.

FIG. 5 illustrates a flow diagram of a machine manager module routine 500. The routine may be provided by, for example, execution of a machine manager module 382 of FIG. 3 and/or a node manager 115 or 125 of FIG. 1, such as to facilitate acquisition of program copies and execution of program instances for one or more associated computing systems being managed. In the illustrated embodiment, each machine manager module routine executes on behalf of a single computing system that is configured to both execute one or more program instances and to store one or more local program copies, with the machine manager module operating in concert with the system manager module routine described with respect to FIGS. 4A-B to manage the execution of programs for the managed computing systems for the program execution service.

The routine begins in step 505 and receives a request related to the execution of one or more programs, such as from the system manager module. The routine proceeds to step 510 to determine whether a request to execute or store an indicated program was received. If so, the routine proceeds to step 515 to determine whether the indicated program is currently stored in the local program repository of the computing system being managed. If not, the routine continues to step 540 to determine whether the local program repository has sufficient capacity to store the indicated program. If not, the routine continues to step 545 and evicts one or more programs from the local program repository, such as is indicated in the request received in step 505 or otherwise based on an eviction policy used by the machine manager module. After step 545, or if it was instead determined in step 540 that the local program repository did have sufficient capacity to store a local copy of the indicated program, the routine proceeds to step 550 and acquires a copy of the indicated program from one or more determined other computing systems. The routine may determine other computing systems that have a stored local copy of the program in various ways, including based on information received as part of the request received in step 505. Additionally, using one or more other techniques such as broadcasts to neighboring computing systems, requests to central directories, and/or peer-to-peer data exchanges may also be used. In other embodiments, the copy of the program may instead be provided along with the request in step 505. Next, the routine proceeds to step 555 and stores the obtained copy of the indicated program in the local program repository. After step 555, or if it was instead determined in step 515 that the indicated program was already stored in the repository, the routine proceeds to step 520 to determine whether an indication of a program to be executed was received. If so, the routine proceeds to step 525 and initiates execution of the indicated program.

If it was instead determined in step 510 that a request to store or execute a program was not received, the routine proceeds to step 535 and performs other indicated operations as appropriate. For example, other operations may include suspending or terminating execution of one or more programs, such as in response to a received request and/or based upon information gathered regarding the performance of the program, such as that the program was behaving erratically or excessively utilizing resources. Additionally, other operations may include responding to requests for status information regarding currently executing programs or the contents of the local program repository, etc.

After steps 535, 525, or if it was instead determined in step 520 that an indication of a program to execute was not received, the routine proceeds to step 530 and sends a status information message to one or more system manager modules. In the illustrated embodiment, the routine sends a status information message to the system manager module after every operation in order to keep the system manager apprised of the state of the computing system managed by the node manager. In other embodiments, the status information may be sent at other times and in other manners. After step 530, the routine proceeds to step 595 and determines whether to continue. If so, the routine returns to step 505, and if not proceeds to step 599 and returns. While not illustrated here, the routine may also perform various housekeeping operations at various times as needed.

Figure 6:
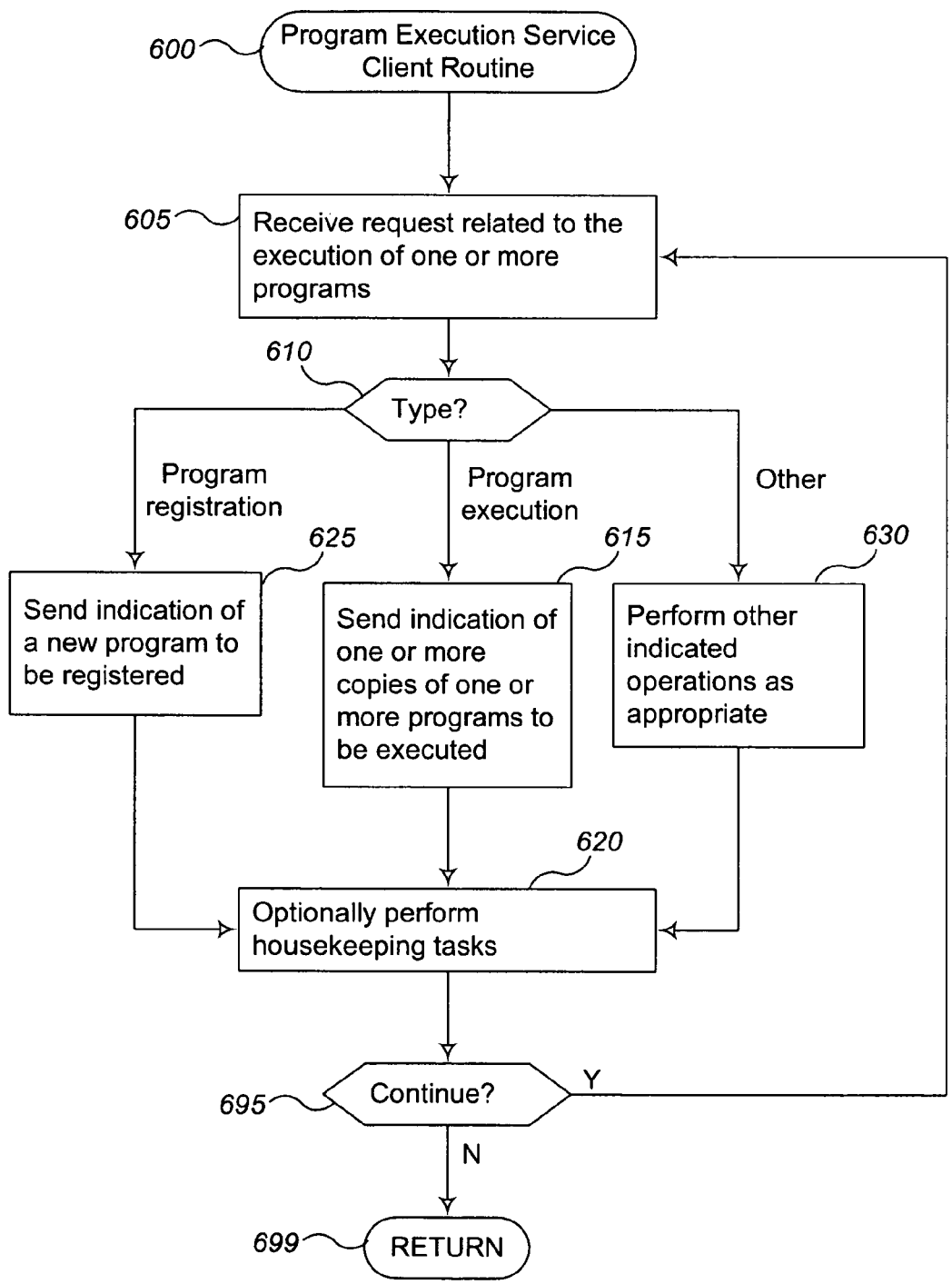
FIG. 6 illustrates a flow diagram of an embodiment of a program execution service client routine.

FIG. 6 illustrates a flow diagram of an embodiment of a program execution service client routine. The routine may, for example, be provided by an application resident on one of the computing systems 180 shown in FIG. 1, such as to provide an interactive console to allow a human user to interact with the program execution service. The routine may alternatively reflect capabilities that are provided by the program execution service interactively to users and/or programmatically to programs of users. Alternatively, this routine may be part of one of the programs that is being executed by the program execution service on one of the managed computing systems, such as to allow such programs to dynamically execute additional program instances for purposes such as load balancing, meeting increased or decreased demand, etc.

The routine begins in step 605 and receives a request related to the execution of one or more programs. In step 610, the routine determines the type of the received message. If the request is related to registration of a new program (or a new version of a previously registered program), the routine proceeds to step 625 and sends an indication of a new program to be registered to the program execution service (e.g., to a system manager module). The indication may include a copy of the program or an instruction of how to obtain the program. If the request is instead determined in step 610 to be related to the execution of a program, the routine proceeds to step 615 to send a request to the program execution service (e.g., to a system manager module) to execute one or more instances of a program to be executed. For example, the routine may use an indication previously received from the program execution service to identify the program and/or the user on whose behalf the program instance(s) will be executed. If it is instead determined in step 610 that some other type of request was received, the routine proceeds to step 625 and performs other indicated operations as appropriate. For example, the routine may send a request to the program execution service to reserve computing resources at a future time to execute one or more indicated program instances, send a status query to the program execution service regarding current or prior execution of one or more programs, provide or update user-related information (e.g., as part of registering the user with the program execution service), de-register or otherwise remove previously registered programs, suspend or terminate execution of one or more program instances, etc.

After steps 615, 625, or 630, the routine continues to step 620 and optionally performs additional housekeeping tasks, such as to update display information, store information received back from the program execution service (not shown) in response to steps 615, 625 or 630, make periodic status queries of the program execution service, etc. After step 620, the routine proceeds to step 695 to determine whether to continue processing. If so, the routine returns to step 605, and if not, proceeds to step 699 and returns.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

As previously noted, various embodiments will organize computing systems of the program execution service into one or more groups in order to facilitate the implementation of policies related to the execution of programs. Additionally, computing systems may be organized in other manners, such as with a hierarchy of groups. For example, the smallest groups may each contain a single computing system, and each computing system will be assigned to its own group. The single-machine groups connected by a single network switch may then further be contained in a switch-level group that contains all of the computing systems physically connected by a single network switch. The switch-level groups may then further be contained in a data center-level group, that contains all of the computing systems in a given data center. The data center-level groups may then be further contained in a universal group that contains all of the computing systems in multiple data centers. In such an organization, the groups at each level generally have successively slower access to copies of programs located on other computing systems in the group, with the single-machine groups providing the fastest access and the universal group providing the slowest access. Such an organization may enable the efficient implementation of the application of various policies that guide the optimum placement of executing programs, as the program execution service may search for the smallest group that has both stored a copy of a particular program to be executed and has the requisite resource availability to execute the program. Alternatively, other embodiments may not model the computing systems in the program execution service by way of groups at all. Such embodiments may, for example, distribute copies of some or all of the programs to dedicated data storage computing or other systems connected to some or all of the network switches or located on some or all hardware racks, and then simply assign programs to be executed to computing systems selected at random.

As previously noted, various embodiments may implement different policies with respect to the selection of computing systems and/or groups as candidates to execute programs and/or receive distribution of program copies. In many cases, various program placement policies may entail tradeoffs between factors such as reliability and efficiency (e.g., startup latency, network latency or throughput, etc.). Placement policies may take into account factors such as the preferences of the user requesting the execution of one or more programs; the number, identity, and location of programs currently executing; the number and identity of programs currently being requested for execution; the number and identity of programs scheduled for execution in the future; the location of previously stored copies of programs; network architecture; geographic location; etc. In addition, default application of policies may in some cases be overridden or modified based on user requests or other factors in some embodiments. For example, a particular embodiment may provide a set of default policies that can be overridden by user preferences as expressed in their requests for the execution of one or more programs.

In embodiments in which the computing systems being managed by a program execution service span multiple data centers, the program execution service may prefer to execute multiple instances of a single program within the same data center and/or to execute instances of multiple distinct programs for the same user within the same data center. Such a policy will tend to allow such programs to take advantage of relatively higher bandwidth intra-data center data exchange for communications between the program instances. On the other hand, some embodiments may prefer to distribute such program instances over multiple data centers in order to assure reliability in cases of power, network, or other large-scale outages that could disable an entire data center, such as for program instances that perform little or no communication with other such program instances. Such preferences to distribute or consolidate such program instances may similarly be applied at various other levels of computing system organization, such as for physical sub-networks, groups, and individual computing systems. In addition, some embodiments may employ policies that may be used to choose between multiple candidate computing systems that are otherwise indistinguishable under the placement policies of the program execution service. For example, one embodiment may randomly select a computing system from a set of equally good candidate computing systems, whereas another embodiment may select the computing system with the lowest resource utilization, while a different embodiment may select such computing systems in a round-robin order.

In addition, various embodiments may implement different policies for the storing of copies of programs in local program storage repositories with respect to the execution of programs. For example, some embodiments may always store a local copy of a program on a local program storage repository prior to (or during or after) its execution on the computing system that houses the local program storage repository. Alternatively, in other embodiments, only some programs will be stored in such local program storage repositories. Furthermore, various embodiments may take different approaches when program storage repositories do not have sufficient capacity to store a local copy of a given program. For example, some embodiments will opt to evict or otherwise remove one or more copies of programs that have been stored in the program repository in order to make space for storing the new program, such as to evict the least recently used copy, the oldest copy, a random copy, a copy selected in a different manner, a copy of a program that is still stored in some other related program repository such as that of one or more other computing systems in a common group, etc. In other embodiments, no eviction will be performed when a given program repository is full (e.g., such as by instead periodically removing all programs from the program repository, such as daily, on reboot, etc., or by removing a program only when it is de-registered from the program execution service).

In some embodiments, programs may be decomposed into multiple, possibly fixed-size blocks of data. By decomposing a program in this manner, a computing system that is acquiring a copy of the program may distribute requests to multiple other computing systems that have stored the required program blocks in their program repositories. As some of the other multiple computing systems respond to requests for program blocks, the acquiring computing system may request additional program blocks from those responding computing systems. Accordingly, computing systems that have sufficient resource availability will be favored to provide program blocks over less responsive or unresponsive computing systems.

Some embodiments may make optimizations to improve the transfer efficiency of programs, such as by only transferring portions of programs that differ from other programs that are possibly already stored in a local program repository. Such approaches may be advantageous given multiple, incremental versions of the same program, or different programs that share significant portions of code or data. For example, if programs are decomposed into multiple, possibly fixed-sized blocks, checksums may be computed for each block and stored when the program is initially registered with the program execution service. Later, when the program is to be obtained for execution, a computing system may compare the program block checksums against checksums associated with blocks of programs resident in one or more program repositories, and then only obtain program blocks that have not already been stored. Alternatively, some embodiments may represent the program as a collection of one or more files, such as executables, data files, and library files. In such a case, two programs may have one or more files (e.g., library files) in common and a given computing system may elect only to obtain the files of a program to be obtained for execution that differ from files that have already been stored in the computing system's program repository.

Some embodiments will provide for programs that are all of a fixed size, whereas others will allow programs of various sizes. Fixed-size programs may simplify the handling of programs in the context of calculating program utilization of system resources such as memory or program repositories. In embodiments that provide for programs of various sizes, various algorithms may be applied to optimize the utilization of fixed-size resources (such as memory or disk space) to limit fragmentation when storing local copies of programs and/or when executing program instances, including various bin-packing algorithms such as best-fit, first-fit, etc.

In addition, some embodiments may provide functionality for seeding or otherwise distributing copies of programs to various of the managed computing systems in advance of requests to execute the programs. While some embodiments will provide at least one universal program repository for storing programs when they are first registered, these embodiments may suffer from high latency when the program is first executed, since the program will not be found in any program repository that is relatively local to the computing system on which it is to be executed. If such an embodiment is configured to store local copies of executed programs in local program repositories, then subsequent executions will incur relatively smaller startup latencies, when compared to the initial execution. The problem of relatively long start up latencies for the initial execution of programs can be addressed by seeding or otherwise distributing copies of programs in advance of requests to execute the program. Such embodiments may distribute one or more copies of the program to program repositories that are local to the one or more data centers that provide the program execution service. In that manner, when a program is requested to be executed for the first time, it will generally be found in a program repository that is relatively local (e.g., at least in the same data center) to the computing system or computing systems that are chosen to execute the program.

In addition, some embodiments may make optimizations in the case of the simultaneous or overlapping initiation of execution of multiple instances of a single program. In such circumstances, it may be the case that a copy of the program to be executed will need to be obtained by multiple distinct computing systems at roughly the same time. If each computing system independently obtains a copy of the program from a remote program repository, over-utilization of network and other resources may result as each computing system initiates transfers of identical data over the network simultaneously. In some circumstances, it may be beneficial for the multiple computing systems to synchronize or otherwise order their acquisition of one or more copies of the program to better utilize system resources (e.g., by minimizing unnecessary network usage). For example, when multiple computing systems selected to execute a program are part of the same group and are to acquire program copies from one or more computing systems outside of the group, it may be beneficial for a first computing system of the multiple computing systems to initially obtain (and store in a local program repository) a copy of the program from the computing systems outside of the group. After the first computing system has obtained a copy of the program, the remainder of the multiple computing systems may obtain copies from the first computing system via the common data exchange medium for the group.

In addition, various additional techniques may be used to efficiently utilize network and/or other computing resources when multiple computing systems are each to acquire a copy of a program. For example, a first of the multiple computing systems may be selected to manage the distribution of copies of the program to the other of the multiple computing systems. If none of the multiple computing systems has a stored copy of the program in a local program repository, the selected computing system may initiate the transfer of at least portions (e.g., blocks) of the program from a remote location. As portions of the program are received by the selected computing system, the selected computing system may multicast the received portions to the other of the multiple computing systems. Such multicasting may result in improved network utilization compared to other network communication mechanisms (e.g., a TCP-based transfer by each of the multiple computing systems) because fewer redundant data packets will be sent to the network connecting the multiple computing systems. Alternatively, if one or more of the multiple computing systems has a stored copy of the program in a local program repository, the selected computing system may direct at least some of the one or more computing systems that have a stored copy of the program to multicast at least portions (e.g., blocks) of the program to other of the multiple computing systems, thereby distributing the load of transferring blocks and minimizing impact on other computing systems and/or portions of the network. After such a multicast-based distribution of the program, one or more of the multiple computing systems may then utilize an alternative communications mechanism (e.g., TCP) in order to obtain any portions of the program that were not received (e.g., because of dropped network packets). The alternative distribution mechanisms may include distributing requests for portions in a round-robin or other manner that distributes load on the other of the multiple computing systems and/or portions of the network).

In some embodiments, additional techniques may further be used. For example, if a multicast-based distribution mechanism is used to distribute portions of a program to computing systems of a group from another computing system in the group, various techniques may be used to prevent or limit any network traffic outside of the group due to the multicast. For example, a short time-to-live may be specified for the multicast packets and/or using packet addressing techniques so that a switch does not transmit the multicast packets to computing systems that are not attached to the switch. Furthermore, some embodiments may implement various policies in order to minimize network resource usage, minimize load on computing systems that are not involved in the transfer or execution of copies of programs for execution, and/or provide predictable performance of network and/or computing resources. For example, some embodiments may limit the rate at which computing systems may transfer copies of programs to other computing systems, whether for multicast and/or point-to-point transmissions. In addition, some embodiments may limit the transfer rate of and/or restrict the proportion of network bandwidth that may be utilized by intermediate network devices (e.g., switches, routers, etc.) as they transfer data packets carrying portions of copies of programs between sub-networks. Such data packets may be identified by intermediate network devices based on, for example, being of a specific type and/or being destined for particular addresses (e.g., multicast IP addresses in a particular range) and/or ports. In some embodiments, multiple mechanisms such as those described above may be combined to implement various network utilization policies.

In some embodiments, various techniques may also be used to migrate one or more executing program instances from one or more computing systems to one or more other computing systems. In one aspect the migration may reflect problems related to the initial computing systems on which the program instances are executing (e.g., failure of the computing systems and/or of network access to the computing systems). In another aspect, the migration may accommodate other program instances to be executed on the initial computing systems, such as for higher-priority program executions, or to consolidate the execution of program instances on a limited number of computing systems, such as to enable the original computing systems executing the program instances to be shut down for reasons such as maintenance, energy conservation, etc. As one specific example, if the one or more program instances executing on a computing system need more resources than are available from that computing system, one or more of the program instances may need to be migrated to one or more other computing systems will additional resources. Overuse of available resources may occur for various reasons, such as one or more computing systems having less resources than expected, one or more of the computing systems using more resources than expected (or allowed), or, in embodiments in which available resources of one or more computing systems are intentionally over-committed relative to possible resources needs of one or more reserved or executing program instances. For example, if the expected resources needs of the program instances are within the available resources, the maximum resource needs may exceed the available resources. Overuse of available resources may also occur if the actual resources needed for program instance execution exceed the available resources. Migration of programs may be performed in various manners, such as to transfer copies of programs locally stored on the initial computing systems to the target destination computing systems and/or to begin executing new instances on the target destination computing systems of the programs executing on the initial computing systems. The migration may occur before the initially executing program instances terminate, if possible, such as to allow current execution state information to be transferred to the new executing program instances and/or to allow other coordination between the initial and new program instances.

Some embodiments may provide a program execution service to multiple customers in exchange for a fee. In such circumstances, customers may register or otherwise provide programs to the program execution service and request the execution of such programs in exchange for a fee. Various billing models may be used, such as for customers to purchase access to various configurations of program execution service resources (e.g., network bandwidth, memory, storage, processor) on a time basis (e.g., minutes, hours, days, etc.), to purchase access to one or more predetermined virtual or physical hardware configurations, to purchase premium services for additional fees (e.g., to provide priority execution, such as to initiate execution of a premium customer's program prior to that of a non-premium customer; to provide priority program repository placement, such as to evict programs belonging to non-premium customers prior to those of a premium customer; etc.); to purchase the ability to execute a program instance for a specified period of time on a per-instance execution basis; etc.

As previously noted, some embodiments may employ virtual computing system, and if so the programs to be executed by the program execution service may include entire virtual computing machine images. In such embodiments, a program to be executed may comprise an entire operating system, a file system and/or other data, and possibly one or more user-level processes. In other embodiments, a program to be executed may comprise one or more other types of executables that interoperate to provide some functionality. In still other embodiments, a program to be executed may comprise a physical or logical collection of instructions and data that may be executed natively on the provided computing system or indirectly by means of virtual computing systems, interpreters, or other software-implemented hardware abstractions. More generally, in some embodiments a program to be executed may include one or more application programs, application frameworks, libraries, archives, class files, scripts, configuration files, data files, etc.

Although embodiments have been described that utilize a combination of intercommunicating system manager modules and machine manager modules to manage the execution of programs within the program execution service, other implementations and allocations of responsibility between the various program execution service modules are also contemplated. For example, in some embodiments, a single module or component may be responsible for managing the execution of programs on some or all of the managed physical computing systems or virtual machines. For example, programs may be directly executed on target computing systems by way of various remote execution techniques (e.g., rexec, rsh, etc.)

Those skilled in the art will also realize that although the example embodiment described above was employed in the context of a data center used to provide a program execution service, other implementation scenarios are possible as well. For example, the described facility could be employed in the context an organization-wide intranet operated by a business or other institution (e.g., university) for the benefit of its employees and/or other members. Alternatively, the described techniques could be employed by a distributed computing system comprising nodes that are individually managed and operated by various third parties for the purpose of performing large-scale (e.g., scientific) computing tasks in a distributed manner.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for managing execution of programs by a program execution service, the program execution service using a plurality of computing systems to execute programs, the plurality of computing systems including multiple groups of computing systems such that the computing systems of each group are physically proximate and share a common group data exchange medium that is specific to that group and such that the multiple groups of computing systems are connected via one or more other data exchange mediums distinct from the group data exchange mediums, the method comprising:

receiving multiple requests that are each to execute an indicated one of multiple programs previously supplied to the program execution service, at least some of the multiple programs each having one or more copies stored locally on one or more of the plurality of computing systems; and for each received request to execute an indicated program, automatically satisfying the request by, automatically selecting at least one of the plurality of computing systems to use in executing an instance of the indicated program, the selecting of the at least one computing systems being based at least in part on whether the selected computing systems are in groups with one or more other systems that store local copies of the indicated program; and for each of the selected computing systems, if the selected computing system is in a group with one or more other systems that store a local copy of the indicated program, instructing the selected computing system to obtain a copy of the indicated program from at least one of the one or more other systems via the shared common group data exchange medium for the group and to initiate execution of the obtained program copy; and if the selected computing system is not in a group with another system that stores a local copy of the one program, instructing the selected computing system to obtain a copy of the indicated program from one or more remote systems via at least one of the one or more distinct data exchange mediums and to initiate execution of the obtained program copy, the automatic selecting and instructing being performed by one or more programmed computing systems.

2. The method of claim 1 wherein the automatic satisfying of each of the received requests is performed by one or more manager computing systems that manage the program execution service, wherein the instructing of a selected computing system in a group to obtain a copy of an indicated program from at least one other system in the group includes providing indications to the selected computing system of the other systems in the group that store a local copy of the indicated program, and wherein the method further comprises, under control of each of multiple selected computing systems:

receiving instructions from a manager computing system to obtain a copy of an indicated program from one or more other indicated systems;

obtaining the copy of the indicated program; and executing the obtained program copy.

3. The method of claim 1 wherein each group of multiple computing systems is connected to a distinct network switch that provides the common group data exchange medium for the group, wherein the one or more other distinct data exchange mediums include connections between the network switches that have lower data transmission speeds than the high-speed data transmissions between computing systems of a group, and wherein the selecting of the at least one computing systems for an indicated program is performed in such a manner as to give preference to computing systems in groups with one or more other systems that store local copies of the indicated program.

4. The method of claim 1 wherein each of at least some of the plurality of computing systems is associated with a local storage capable of storing copies of multiple programs, wherein the selecting of a computing system includes determining whether any of the at least some computing systems are in a group with that computing system and currently store a local copy of an indicated program, and further comprising, for each of one or more of the selected computing systems and after obtaining a copy of an indicated program to be executed, storing the obtained copy in local storage of the selected computing system.

5. The method of claim 1 wherein at least some of the groups of computing systems each include one or more data storage systems that have local storage capable of storing copies of multiple programs for use by other computing systems of the group, wherein the selecting of a computing system includes determining whether any of the one or more data storage systems are in a group with that computing system and currently store a local copy of an indicated program, and further comprising, for each of one or more of the selected computing systems and after obtaining a copy of an indicated program to be executed, storing the obtained copy in local storage of a data storage system in a group with the computing system.

6. The method of claim 1 further comprising, before the receiving of the multiple requests, receiving a copy of one of the multiple programs and storing copies of the one program on computing systems in multiple groups for later use in satisfying requests to execute the one program.

7. The method of claim 1 wherein the plurality of computing systems are part of a distributed network of computing systems for executing programs of customers of the program execution service, wherein the multiple programs previously supplied to the program execution service are programs supplied by the customers, and wherein at least some of the plurality of computing systems each host multiple virtual machine nodes that each is capable of executing at least one of the multiple programs.

8. The method of claim 1 wherein at least some of the multiple requests to execute indicated programs each include an indication of at least one of a number of instances of an indicated program to execute, of a time to initiate execution of the instances of the indicated program, of one or more hardware resources for use in executing the instances of the indicated program, and of geographic information related to executing the instances of the indicated program, and wherein the automatic satisfying of each of the at least some requests is performed in such a manner as to accommodate the at least one indications for the request.

9. The method of claim 8 wherein at least some of the indicated programs each have associated hardware resource criteria for execution, and wherein the automatic selecting of the at least one computing systems for use in executing each of the at least some indicated programs is further performed such that each of the selected computing systems provides hardware resources that satisfy the associated hardware resource criteria for the indicated program.

10. The method of claim 9 wherein the associated hardware resource criteria include at least one of an indicated amount of memory, an indicated amount of processor usage, an indicated amount of network bandwidth, an indicated amount of disk space, and an indicated amount of swap space.

11. The method of claim 9 wherein the automatic selecting of the at least one computing systems for use in executing each of the at least some indicated programs is further based in part on whether one or more other machines in a group with a selected computing system is currently executing a copy of the indicated program.

12. A computer-implemented method for managing execution of programs by a program execution service, the method comprising:
receiving an indication of a program to be executed on at least one of multiple computing systems of a predefined group, the multiple computing systems being provided for execution of programs for a program execution service and sharing a common data exchange medium;
determining whether one or more of the computing systems of the predefined group stores a copy of the indicated program; and
automatically obtaining a local copy of the indicated program for execution by,
if it is determined that one or more of the computing systems of the predefined group store a copy of the indicated program, obtaining the local copy from at least one of the one or more computing systems via the common data exchange medium; and
if it is not determined that one or more of the computing systems of the predefined group store a copy of the indicated program, obtaining the local copy from one or more computing systems external to the predefined group via one or more data exchange mediums distinct from the common data exchange medium, the automatic obtaining being performed by one or more programmed computing systems.

13. The method of claim 12 further comprising initiating execution of the obtained local copy of the indicated program on one of the multiple computing systems of the predefined group.

14. The method of claim 13 wherein the method is performed by the one computing system.

15. The method of claim 13 wherein the method is performed by a manager module for the predefined group.

16. The method of claim 12 further comprising initiating execution of multiple instances of the obtained local copy of the indicated program on multiple of the computing systems of the predefined group.

17. The method of claim 12 further comprising sending status information regarding one or more of the multiple computing systems of the predefined group to a remote system manager for use in managing the program execution service.

18. The method of claim 17 wherein the status information includes at least one of an indication of one or more program copies stored on the one or more computing systems, an indication that execution of the indicated program has been initiated, an indication of one or more programs currently executing on the one or more computing systems, and an indication of resource utilization of one or more programs executing on the one or more computing systems.

19. The method of claim 12 wherein the multiple computing systems of the predefined group are all located in a single physical location, the physical location being one of a single hardware rack, a single data center, an area served by a single local area network, and an area served by a single network switch.

20. The method of claim 19 wherein the program execution service further uses multiple other groups to execute programs, each of the other groups having multiple other computing systems in other physical locations.

21. The method of claim 20 wherein the one or more computing systems external to the predefined group from which a local copy is obtained are in one or more of the other groups.

22. The method of claim 20 wherein the one or more computing systems external to the predefined group from which a local copy is obtained are part of a remote storage system that is distinct from the multiple groups used by the program execution service to execute programs.

23. The method of claim 19 wherein the common data exchange medium is a physical data connection between the computing systems in the single physical location, the physical data connection not being shared with computing systems external to the predefined group.

24. The method of claim 12 wherein the common data exchange medium provides higher data exchange bandwidth than the one or more distinct data exchange mediums.

25. The method of claim 12 wherein the multiple computing systems of the predefined group are physically proximate to each other.

26. The method of claim 12 wherein the multiple computing systems of the predefined group are logically proximate to each other.

27. The method of claim 12 wherein the received indication of the program to be executed includes an indication of one or more computing systems of the predefined group that each store a copy of the indicated program, and wherein the determining of whether one or more of the computing systems of the predefined group stores a copy of the indicated program is based at least in part on the received indication of the one or more computing systems.

28. The method of claim 12 wherein the determining of whether one or more of the computing systems of the predefined group stores a copy of the indicated program includes sending a request to one or more computing systems of the predefined group for information related to stored copies of the indicated program.

29. The method of claim 12 wherein the automatic obtaining of the local copy of the indicated program includes storing the obtained local copy in a local program repository of one of the computing systems of the predefined group that contains one or more stored copies of other programs.

30. The method of claim 29 wherein the storing of the obtained local copy of the indicated program in the local program repository includes removing at least one stored copy of another program in order to provide storage space for the obtained local copy.

31. The method of claim 30 wherein the at least one removed copies of the another programs are selected for removal based at least in part on how recently those copies were used for execution of the another programs.

32. The method of claim 12 wherein obtaining the local copy of the indicated program includes obtaining a portion of the local copy from each of multiple computing systems that have access to a stored copy of the indicated program.

33. The method of claim 32 wherein the obtaining of the portion of the local copy from each of the multiple computing systems includes requesting a portion of the local copy from each of the multiple computing systems and requesting additional portions of the local copy from a subset of the multiple computing systems based on responses received to one or more prior requests.

34. The method of claim 12 wherein the receiving of the indication of the program to be executed on at least one of the multiple computing systems of the predefined group includes selecting the predefined group from multiple groups of computing systems used by the program execution service, the selecting being based on current conditions of the selected group.

35. The method of claim 34 wherein the current conditions of the selected group include at least one of whether one or more computing systems of the selected group are available to execute the indicated program, whether one or more computing systems of the selected group are currently executing a copy of the indicated program, and whether one or more computing systems of the selected group have a stored copy of the indicated program.

36. The method of claim 12 further comprising determining that multiple computing systems of the predefined group need a local copy of the indicated program for execution.

37. The method of claim 36 further comprising obtaining a single copy of the indicated program on behalf of all of the multiple computing systems via a data exchange medium distinct from the common data exchange medium, and distributing local copies of the obtained single copy to each of the multiple computing systems via the common data exchange medium.

38. The method of claim 12 further comprising, after the obtaining of the local copy of the indicated program:
 executing an instance of the indicated program;
 storing the local copy of the indicated program for later use;
 after the storing of the local copy, receiving an indication to execute a new version of the indicated program;
 automatically obtaining a new local copy of the new version of the indicated program for execution; and
 storing the new local copy of the new version of the indicated program for later use in lieu of the stored local copy.

39. The method of claim 12 wherein at least some of the multiple computing systems of the predefined group each host multiple virtual machines that are each able to execute at least one program, and wherein the indicated program is a virtual machine image to be executed by at least one of the virtual machines.

40. A non-transitory computer-readable storage medium whose contents include instructions that when executed configure a computing system to manage execution of programs, by performing a method comprising:
 determining to execute at least one instance of an indicated program;
 automatically selecting one or more computing machines for use in executing one or more instances of the indicated program, the selected computing machines each being one of a plurality of computing machines that each belong to one of multiple groups, the selecting of the one or more computing machines being based at least in part on whether each of the selected computing machines is a member of a group that contains at least one machine with a stored copy of the indicated program from which the stored copy may be obtained and at least one computing machine that is available to execute the indicated program; and
 providing an indication to initiate execution of the indicated program on at least one of the selected computing machines, the at least one of the selected computing machines obtaining a local copy of the indicated program by:
  if it is determined that the at least one of the selected computing machines is in a group with at least one computing machine storing a copy of the indicated program, obtaining the local copy from the at least one computing machine storing a copy of the indicated program in the group; and
  if it is not determined that the at least one of the selected computing machines is in a group with at least one computing machine storing a copy of the indicated program, obtaining the local copy from one or more computing machines external to the group.

41. The non-transitory computer-readable storage medium of claim 40 wherein the automatic selecting of the one or more computing machines includes selecting one of the groups that includes multiple computing machines, the selected one or more computing machines each being one of the multiple computing machines of the selected group.

42. The non-transitory computer-readable storage medium of claim 41 wherein the selecting of the one group is based at least in part on the selected group containing at least one machine that has a stored copy of the indicated program and at least one computing machine that is available to execute the indicated program.

43. The non-transitory computer-readable storage medium of claim 40 wherein each selecting of the one or more computing machines includes selecting a particular computing machine of a particular group that is available to execute the indicated program.

44. The non-transitory computer-readable storage medium of claim 43 wherein the selecting of each of the particular computing machines is based at least in part on the selected computing machine having a previously stored local copy of the indicated program.

45. The non-transitory computer-readable storage medium of claim 40 wherein the indicated program uses an indicated amount of memory when executing, wherein at least some of the computing machines are each configured to simultaneously execute multiple programs that use varying amounts of memory when executing, and wherein the selecting of the one or more computing machines based on the at least one computing machine being available to execute the indicated program includes selecting a computing machine that currently has an amount of memory available to execute a program that meets or exceeds the indicated amount of memory.

46. The non-transitory computer-readable storage medium of claim 40 wherein the indicated program has one or more associated resource criteria for execution, and wherein a computing machine that is available to execute the indicated program has available resources sufficient to satisfy each of the one or more associated resource criteria.

47. The non-transitory computer-readable storage medium of claim 46 wherein the one or more associated resource criteria includes at least one of an amount of memory, an amount of processor usage, an amount of network bandwidth, an amount of disk space, and an amount of swap space.

48. The non-transitory computer-readable storage medium of claim 40 wherein the automatic selecting of the one or more computing machines is further based in part on the one or more selected computing machines being members of one or more groups that each contain at least one computing machine that is currently executing a copy of the indicated program.

49. The non-transitory computer-readable storage medium of claim 40 wherein the indication to initiate execution of the indicated program is provided to each of at least one of the selected computing machines.

50. The non-transitory computer-readable storage medium of claim 49 wherein the indication provided to a selected computing machine to initiate execution of the indicated program includes an indication of one or more computing machines in the group of the selected computing machine that have a stored copy of the indicated program.

51. The non-transitory computer-readable storage medium of claim 40 wherein the computing system operates on behalf of a program execution service, wherein the indicated program is one of multiple programs associated with the program execution service by customers of the program execution service, and wherein the plurality of computing machines are used by the program execution service to execute the multiple programs on behalf of the customers.

52. The non-transitory computer-readable storage medium of claim 51 wherein each of the multiple groups is a predefined group that includes multiple computing machines that are physically proximate and that share being located on a single hardware rack, located on a single local area network, connected to a single network switch, and/or located in a single data center.

53. The non-transitory computer-readable storage medium of claim 40 wherein each of the multiple groups include a distinct data exchange medium that is shared by the computing machines that belong to that group but that is not shared by computing machines that belong to other groups.

54. The non-transitory computer-readable storage medium of claim 40 wherein at least some of the plurality of computing machines each have associated local program repositories for storing copies of one or more programs, and wherein the method further comprises selecting at least one stored copy of a program to each be removed from one or more of the associated local program repositories and replaced with a copy of the indicated program.

55. The non-transitory computer readable storage medium of claim 54 wherein the at least one stored program copies selected for removal are less recently used than other stored copies of programs.

56. The non-transitory computer-readable storage medium of claim 40 wherein the method further comprises, in response to a received indication of another program for later execution, sending to one or more computing machines an indication to store a local copy of the another program for later use.

57. The non-transitory computer-readable storage medium of claim 40 wherein the method further comprises repeatedly receiving status information regarding at least some of the plurality of computing machines, and wherein the automatic selecting of the one or more computing machines is based at least in part on received status information.

58. The non-transitory computer-readable storage medium of claim 57 wherein the status information includes at least one of an indication of copies of programs that are stored, an indication of instances of programs that are being executed, and an indication of resource utilization of programs that are being executed.

59. The non-transitory computer-readable storage medium of claim 40 wherein the method further comprises determining to migrate at least one currently executing program from a first of the plurality of computing machines to a second of the plurality of computing machines, and initiating migration of the at least one executing programs to the second computing machine.

60. The non-transitory computer-readable storage medium of claim 40 wherein at least some of the plurality of computing machines are each configured to execute multiple programs concurrently.

61. The non-transitory computer-readable storage medium of claim 60 wherein the at least some computing machines each host multiple virtual machines that are each able to execute at least one program, and wherein the indicated program is a virtual machine image to be executed by at least one of the virtual machines.

62. The non-transitory computer-readable storage medium of claim 40 wherein the determining to execute the at least one instance of the indicated program is based on a request received from a user that indicates a number of instances desired to be executed.

63. The non-transitory computer-readable storage medium of claim 62 wherein the received request further includes one or more indications related to one or more computing machines for use in executing the at least one instance of the indicated program, and wherein the automatic selecting of the one or more computing machines is further based on the one or more received indications.

64. The non-transitory computer-readable storage medium of claim 62 wherein the method further comprises receiving multiple requests from multiple users to execute instances of multiple programs, and automatically selecting one or more computing machines for use with each of the requests.

65. The non-transitory computer-readable storage medium of claim 64 wherein the multiple programs each have associated resource criteria such that at least some of the associated resource criteria will be used during execution of each instance of the program, and wherein the automatic selecting of the computing machines for use with the multiple requests includes associating multiple program instances to be executed on one or more computing machines such that the associated resource criteria of the multiple program instances exceeds available resources of the one or more computing machines.

66. The non-transitory computer-readable storage medium of claim 40 wherein multiple instances of the indicated program are to be simultaneously executed on multiple computing machines, and wherein the automatic selecting of the one or more computing machines includes selecting multiple computing machines from multiple groups to execute the multiple instances in order to balance use of resources by the multiple instances.

67. The non-transitory computer-readable storage medium of claim 40 wherein the computer-readable storage medium is a memory of the computing system.

68. A system configured to manage execution of programs, comprising:
 a memory; and
 a system manager module configured to, in response to a determination to execute at least one instance of an indicated program,
  automatically select one or more computing machines for executing one or more instances of the indicated program, the selected computing machines being from one or more of multiple groups, the selecting of a computing machine being based at least in part on whether the selected computing machine is a member of a group that includes one or more machines that have a stored copy of the indicated program from which the selected computing machine may obtain a copy of the indicated program, the selected computing machine not having a stored copy of the indicated program at a time of the selecting; and for each of the selected computing machines,
if the selected computing machine is in a group with one or more other machines that store a local copy of the indicated program, instruct the selected computing machine to obtain a copy of the indicated program from at least one of the one or more other machines of the group; and
if the selected computing machine is in a group without another machine that stores a local copy of the indicated program, instruct the selected computing machine to obtain a remote copy of the indicated program.

69. The system of claim 68 further comprising multiple groups of computing machines such that each group includes multiple computing machines that share a common physical data connection not shared by computing machines external to the group, each computing machine being configured to execute at least one program, at least one machine of each group being configured to store copies of multiple programs.

70. The system of claim 69 wherein the common physical data connections shared by the multiple computing machines of the multiple groups are each provided by a distinct network switch.

71. The system of claim 69 further comprising multiple machine manager modules each associated with one of the multiple groups and each configured to, in response to a determination to execute at least one instance of an indicated program of which at least one of the machines of the associated group has a stored copy, facilitate obtaining a copy of the indicated program for execution from one or more of the at least one machines via the common physical data connection shared by the multiple computing machines of the associated group.

72. The system of claim 71 wherein the system is operated by a program execution service and further comprises a remote storage module that is accessible to the multiple machines of the multiple groups and that is configured to store copies of multiple programs from customers of the program execution service and to provide a copy of one of the multiple programs in response to a received request.

73. The system of claim 72 wherein the multiple machine manager modules are each further configured to, in response to an indication of a program of which none of the machines of the associated group for the machine manager module has a stored copy, facilitate obtaining a copy of the indicated program from the remote storage module.

74. The system of claim 73 wherein the multiple machine manager modules are each further configured to, after an indication of a program of which none of the machines of the associated group for the machine manager module has a stored copy and in response to a determination to execute at least one instance of the indicated program, determine whether any of the multiple groups of computing machines have at least one machine that stores a copy of the indicated program and facilitate obtaining a copy of the indicated program from one or more machines of one or more of the multiple groups if any are determined to store a copy of the indicated program.

75. The system of claim 74 wherein the facilitating of the obtaining of a copy of an indicated program from the remote storage module is performed only if none of the multiple groups of computing machines are determined to have at least one machine that stores a copy of the indicated program.

76. The system of claim 71 wherein the multiple machine manager modules are each further configured to initiate execution of an obtained copy of a program on at least one of the computing machines of the associated group for the machine manager module.

77. The system of claim 76 wherein the system manager module is further configured to, after selecting a computing machine of one of the multiple groups for executing an instance of an indicated program, send instructions to a machine manager module associated with the one group to provide a determination to execute at least one instance of the indicated program and to provide information to facilitate determining whether at least one of the machines of the one group has a stored copy of the indicated program.

78. The system of claim 71 wherein each of the computing machines executes one of the multiple machine manager modules, wherein the facilitating of the obtaining of a copy of an indicated program by a machine manager module includes obtaining the indicated program copy, and wherein each machine manager module is further configured to initiate execution of an obtained program copy on the computing machine executing the machine manager module.

79. The system of claim 71 wherein the system manager module and the multiple machine manager modules each include software instructions for execution in memory of one or more computing machines of the system.

80. The system of claim 68 wherein the system manager module consists of a means for, in response to a determination to execute at least one instance of an indicated program, automatically selecting one or more computing machines for executing one or more instances of the indicated program, the selected computing machines being from one or more of multiple groups, the selecting of a computing machine being based at least in part on the selected computing machine being a member of a group that includes one or more machines that have a stored copy of the indicated program from which the selected computing machine may acquire a copy of the indicated program.

81. The system of claim 68 wherein at least some of the selected computing machines each host multiple virtual machines that are each able to execute at least one program, and wherein the indicated program is a virtual machine image to be executed by at least one of the virtual machines.

* * * * *